(12) United States Patent
Zimmerman et al.

(10) Patent No.: US 12,551,107 B2
(45) Date of Patent: Feb. 17, 2026

(54) SYSTEMS AND METHODS OF ANALYZING AND INTERFACING WITH COMBINED IMAGING AND SPECTROSCOPY DATA FOR THE BRAIN

(71) Applicant: BrainSpec, Boston, MA (US)

(72) Inventors: Alex Zimmerman, Newport, RI (US); Alexander Lin, Waban, MA (US)

(73) Assignee: BrainSpec Inc., Boston, MA (US)

( * ) Notice: Subject to any disclaimer, the term of this patent is extended or adjusted under 35 U.S.C. 154(b) by 0 days.

(21) Appl. No.: 17/105,426

(22) Filed: Nov. 25, 2020

(65) Prior Publication Data

US 2021/0169332 A1  Jun. 10, 2021

Related U.S. Application Data

(60) Provisional application No. 62/941,639, filed on Nov. 27, 2019.

(51) Int. Cl.
*A61B 5/00* (2006.01)
*A61B 5/055* (2006.01)
(Continued)

(52) U.S. Cl.
CPC ............ *A61B 5/0042* (2013.01); *A61B 5/055* (2013.01); *A61B 5/4866* (2013.01); *A61B 5/743* (2013.01);
(Continued)

(58) Field of Classification Search
CPC ..... A61B 5/0042; A61B 5/055; A61B 5/4866; A61B 5/743; A61B 5/14507;
(Continued)

(56) References Cited

U.S. PATENT DOCUMENTS

| 2002/0109684 A1* | 8/2002 | Repin | G06T 15/503 |
| | | | 345/424 |
| 2009/0102481 A1* | 4/2009 | Haacke | G01R 33/565 |
| | | | 324/318 |
| 2016/0292860 A1* | 10/2016 | Li | G06T 7/0016 |

OTHER PUBLICATIONS

Schiepers et al., "Positron emission tomography, magnetic resonance imaging and proton NMR spectroscopy of white matter in multiple sclerosis", Multiple Sclerosis, Published 1997 (Year: 1997).*

(Continued)

*Primary Examiner* — Patricia J Park
(74) *Attorney, Agent, or Firm* — K&L Gates LLP

(57) ABSTRACT

In part, the disclosure relates to an analysis system in communication with one or more sources of brain region or brain tissue-specific spectroscopy data; and computer-executable logic, encoded in memory of the analysis system, for interpreting brain region or brain tissue-specific spectroscopy data, where the computer-executable logic is configured for execution of: processing the brain region or brain tissue-specific spectroscopy data to obtain one or more spectroscopic graphical representations of the brain region or brain tissue-specific spectroscopy data; co-registering such representations with regions of interest in imaging data obtained relative thereto, where the imaging data is obtained simultaneously with the spectroscopy data; and displaying a first visual representation of co-registered brain region or brain tissue-specific spectroscopy data and imaging data. The visual representation may include one or more views of brain tissue and a spatially correlated map of changes in brain region or tissue-specific spectroscopy data.

15 Claims, 21 Drawing Sheets
(21 of 21 Drawing Sheet(s) Filed in Color)

(51) Int. Cl.
*G01R 33/465* (2006.01)
*G01R 33/56* (2006.01)
(52) U.S. Cl.
CPC ....... *G01R 33/465* (2013.01); *G01R 33/5608* (2013.01)
(58) Field of Classification Search
CPC .............. A61B 5/14546; A61B 5/4088; A61B 2576/026; G01R 33/465; G01R 33/5608; G01R 33/46; G01R 33/485; G06T 11/206; G16H 30/40; G16H 50/20; G16H 30/20
See application file for complete search history.

(56) References Cited

OTHER PUBLICATIONS

ISMRM Raw Data Format: A Proposed Standard for MRI Raw Datasets (Year: 2017).*

J.P. Wijnen, et al., "Quantitative Short Echo Time 1H MRSI of the Peripheral Edematous Region of Human Brain Tumors in the Differentiation Between Glioblastoma, Metastasis, and Meningioma" published 2012 (Year: 2012).*

International Search Report and Written Opinion for International application No. PCT/US2020/062429 mailed from the International Searching Authority on Mar. 11, 2021 (15 pages).

A.A. Tzika et al., "Spectroscopic and Hemodynamic MR Characterization of Pediatric Brain Tumors", International Society for Magnetic Resonance in Medicine, ISMRM, 2030 Addison Street, 7th Floor, Berkeley, CA 94704 USA, Aug. 19, 1994, (1 page).

Doelken et al., "Multi-voxel Magnetic Resonance Spectroscopy at 3T in Patients with Idiopathic Generalised Epilepsy", Seizure, Bailliere Tindall, London, GB, vol. 19, No. 8, Oct. 1, 2010 (pp. 485-492).

Cereda et al., "Memory impairment and tonic-clonic seizure in a 39-year-old woman", Lancet Neurology, Lancet Publishing Group, London, GB, vol. 4, No. 10, Oct. 1, 2005, pp. 683-688.

* cited by examiner

| Value | CRLB | Metabolite | Value | CRLB | |
|---|---|---|---|---|---|
| 2.06 | ⟩ 2 | NAA / Creatine 1.67 ± 0.46 | 0.25 | ⊘ 21 | |
| 7.98 | ⟩ 2 | NAA / Choline 5.27 ± 2.35 | 0.24 | ⊘ 21 | |
| 0.26 | ⟩ 6 | Choline / Creatine 0.32 ± 0.17 | 1.04 | ⟩ 3 | |
| 0.00 | ⟩ 999 | 2HG / Creatine 0.10 ± 0.10 | 2.25 | ⟩ 12 | |

Fig. 11

SYSTEMS AND METHODS OF ANALYZING AND INTERFACING WITH COMBINED IMAGING AND SPECTROSCOPY DATA FOR THE BRAIN

CROSS REFERENCE TO RELATED APPLICATIONS

The application claims priority to and benefit of U.S. Provisional Application No. 62/941,639 filed on Nov. 27, 2019, the entire disclosure of which is incorporate by reference herein.

FIELD

The disclosure relates generally to magnetic resonance spectroscopy (MRS) and imaging systems and methods suitable for providing diagnostic information relative to brain tissue and other analyte containing tissues.

SUMMARY

In part, the disclosure relates to a diagnostic image and spectroscopic system. The system includes an analysis system in communication with one or more sources of brain region or brain tissue-specific spectroscopy data; and computer-executable logic, encoded in memory of the analysis system, for interpreting brain region or brain tissue-specific spectroscopy data, wherein the computer-executable logic is configured for execution of: processing the brain region or brain tissue-specific spectroscopy data to obtain one or more spectroscopic graphical representations of the brain region or brain tissue-specific spectroscopy data; co-registering the one or more spectroscopic graphical representations with regions of interest in imaging data obtained relative to brain tissue, wherein the imaging data is obtained simultaneously with the brain region or brain tissue-specific spectroscopy data; and displaying a first visual representation of co-registered brain region or brain tissue-specific spectroscopy data and imaging data, wherein the first visual representation includes one or more sectional or three-dimensional views of brain tissue and a spatially correlated map of changes in brain region or brain tissue-specific spectroscopy data.

In one embodiment, the first visual representation includes a set of indicia corresponding to two or more classifications of a metabolite. In one embodiment, the two or more classifications of the metabolite are generated using one or more ranges, wherein the ranges are selected from the group consisting of metabolite profile, patient age, echo time, and field strength of MM. In one embodiment, the one or more classifications are low and high, wherein the classification is determined using one or more ranges and one or more thresholds. These thresholds may be determined by scaling data from the appropriate set of parameters such as patient age, echo time, and field strength to place results on a percentile scale. In one embodiment, the first visual representation includes indicia corresponding to upper, lower and reference ranges for a metabolite, wherein one or more of the ranges are determined using one or more range parameters. The display of a reference range may include scaling results on a zero to one-hundred percentile rating based on the appropriate parameters selected. In one embodiment, the range parameters are selected from the group consisting of profile, patient age, pulse sequence, echo time, and field strength of MRI. In one embodiment, the indicia corresponding to a metabolite are co-registered relative to a region of an MRI image. In one embodiment, the brain region or brain tissue-specific spectroscopy data is magnetic resonance spectroscopy (MRS) data. In one embodiment, the imaging data is magnetic resonance imaging (MRI) data.

In one embodiment, the first visual representation shows a correlation between a first voxel and an associated location in the imaging data. In one embodiment, the first visual representation includes a color mapping of voxels overlaid relative to an image rendered from the imaging data. In one embodiment, opacity of the color mapping of voxels is adjustable. In one embodiment, the computer-executable logic is configured for the execution of displaying a second visual representation of the imaging data and the brain region or brain tissue-specific spectroscopy data, wherein the second representation shows a correlation between a second voxel and an associated location in the imaging data. In one embodiment, when a first voxel is selected, the first visual representation includes MRS data showing metabolite concentrations. In one embodiment, the first visual representation includes a list of each metabolite and each metabolite's concentration detected at the first voxel.

In part, the disclosure relates to a method of analyzing and representing metabolite levels in brain tissue. The method includes processing brain region or brain tissue-specific spectroscopy data to obtain one or more spectroscopic graphical representations of the brain region or brain tissue-specific spectroscopy data; co-registering the one or more spectroscopic graphical representations with regions of interest in imaging data obtained relative to brain tissue, wherein the imaging data is obtained simultaneously with the brain region or brain tissue-specific spectroscopy data; and displaying a first visual representation of co-registered brain region or brain tissue-specific spectroscopy data and imaging data, wherein the visual representation includes one or more sectional or three-dimensional views of brain tissue and a spatially correlated map of changes in brain region or brain tissue-specific spectroscopy data.

In one embodiment, brain region or brain tissue-specific spectroscopy data includes metabolite data or data derived from metabolite data measured relative to brain tissue of a subject using MRS. In one embodiment, the first visual representation includes a set of indicia corresponding to two or more classifications of metabolite data or data derived from metabolite data. In one embodiment, the first visual representation includes indicia corresponding to upper, lower and reference ranges for a metabolite, wherein one or more of the ranges are determined using one or more range parameters. In one embodiment, the range parameters are selected from the group consisting of profile, patient age, pulse sequence, echo time, and field strength of MRI.

In various embodiments, the systems and methods disclosed herein are operable to compare results with one or more specific brain regions such as the thalamus or anterior cingulate cortex, for example. In various embodiments, the systems and methods disclosed herein are also operable to perform automatic data quality detection. The systems and methods may be operable to filter data based on a plurality of metrics. These metrics may include, for example, SNR, full width half max, Cramer-Rao lower bounds and phasing. Once filtering has been performed based on one or more metrics, the filtered data may be categorized as useable or good quality data and poor quality data based on appropriate thresholds. In various embodiments, poor quality data may be excluded and not used for a given data analysis and display process.

Other embodiments of this aspect include corresponding computer systems, apparatus, and computer programs recorded on one or more computer storage devices, each configured to perform the actions of the methods.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The skilled person in the art will understand that the drawings, described below, are for illustration purposes only. The drawings are not intended to limit the scope of the applicant's teachings in any way.

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

FIG. 11 shows range bars of various metabolites, in accordance with an embodiment of the disclosure.

DETAILED DESCRIPTION

Figure 1:
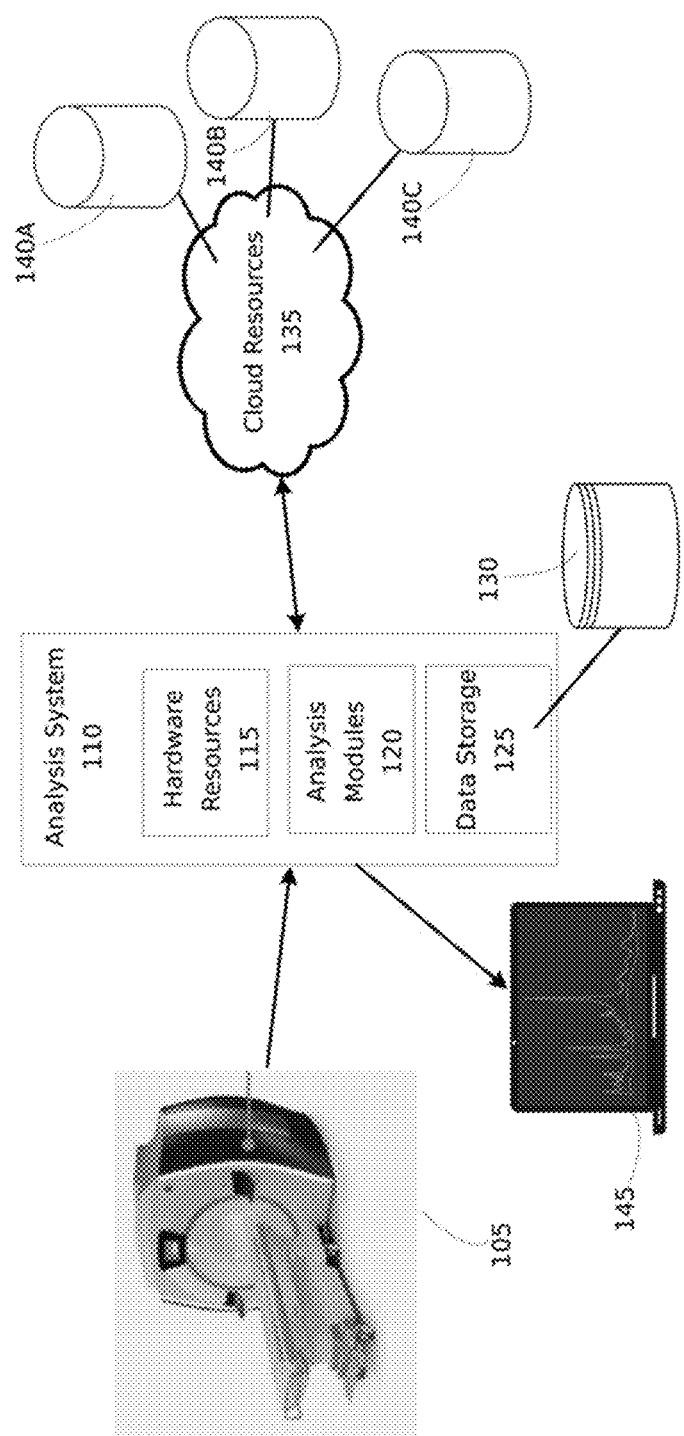
FIG. 1 is a simplified diagram of an analysis system working in conjunction with an MRI device and cloud resources, in accordance with an embodiment of the disclosure.

The disclosure relates to the use of an analysis system and software to facilitate acquiring and using Magnetic Resonance Spectroscopy (MRS) data. In particular, MRS data is obtained relative to tissue of interest, such as brain tissue that includes various analytes. In various embodiments, MRS data sets are obtained simultaneously with MM data sets. In turn, the MRS data sets can be transformed to generate various indicia or graphic user interface representations such as a color map or other visual representation. In various embodiments, the representations used to display MRS and/or MM data are bounded with regard to a particular parameter being evaluated and displayed. In one embodiment, a representation with various indicia, such as a color legend or scale is generated using ranges that are defined using combinations of two or more the following: metabolite profile, patient age, echo time, and field strength of MM. In one embodiment, the ranges may be generated using statistical analysis of control data to create bounds for upper, lower and reference ranges for a parameter of interest such as user selected metabolite ratio or other parameter generated from MRS data, MM data, or combinations thereof.

In various embodiments, different thresholds and ranges are set to facilitate displaying information in various categories. The categories for a given data type, such as abnormal data, high data values, low data values, and others can be set based on a data metric or value being above a threshold, below a threshold, and above a threshold or below a threshold. In some embodiments, different thresholds can be set for upper and lower ranges. Thus, a given analyte ratio can be above value X, but below value Y in some embodiments.

Further, in various embodiments, a representation of MRS data for a particular tissue region of interest is mapped, registered, and/or co-registered with an image of brain tissue that includes the particular tissue region of interest. For a given subject, an MM image of the brain may be displayed with an overlay or other graphic user interface representation of transformed MRS data. The graphical user interface representations of MRS data such as through color maps or other on screen graphic elements co-registered with MM image data allows a user to visualize spectroscopic data relative to various analytes and other tissue changes in the brain in the context of the physical location of such spectroscopic data in the brain. These color maps can be bounded using the ranges, thresholds, and categories described herein.

Generally, MRS is a non-invasive, ionizing-radiation-free analytical technique that can be used to study metabolic changes in brain tumors, strokes, seizure disorders, Alzheimer's disease, depression, and other diseases affecting the brain. Typically, an MRS scan acquires signals from a single localized region, referred to as a "voxel." MRS data can be used to determine the relative concentrations and physical properties of a variety of biochemical referred to as "metabolites" due to their role in the metabolism.

Often, MRS data is placed into color maps scaled from the data itself, meaning the upper limit of the map is the highest numerical value of the displayed data and the lower limit of the map is the lowest numerical value of the displayed data. This makes comparing results between scans difficult as various regions may not be clinically relevant but simply a local maximum in the dataset. However, generally setting appropriate limits is challenging, as it requires appropriate consideration of data acquisition parameters (field strength, pulse sequence, echo time) and patient variables (age, condition, brain region) to set clinically meaningful bounds for each metabolite map selected. Improvements to analysis of MRS data would be beneficial to the medical industry and this disclosure addresses the challenge and other technical problems associated with analyzing MRS data. The present disclosure addresses some of the foregoing technical problems and challenges.

Traditionally, spectroscopy data is analyzed on the imaging MM scanner itself or using research tools providing more sophisticated quantification platforms. While MRI vendors recognize the potential benefits of MRS, they implement technology and techniques that are often impediments to realization of the full benefits of using MRS data. For example, each MM vendor uses a proprietary data format using a unique file format that must be parsed and decoded to facilitate any analysis. While MRI vendors have attempted to implement proprietary hardware and software to analyze MR spectra, the output is saved as static images from preselect region, which does not facilitate ease of use by medical professionals. As these images are in static form, it is challenging to search through data sets, where up to eight slices of data are acquired for each of 256 voxels. Typically, each MR spectra includes more than a single peak corresponding to a single metabolite and often includes many metabolites present in the signal with overlapping peaks, including the baseline and macromolecules.

Typically, while an MRI measures signals from large quantities of fat and water in the brain to produce structural images, an MRS suppresses these signals to enable sensitivity to detect other important metabolites in brain tissue. In various cases, MRS measures a variety of key metabolites, which are known to have reference ranges and deviations from these ranges, where the deviations from these ranges are strong indicators of dysfunction and disease.

For example, N-Acetylaspartate (NAA) is synthesized by mitochondria and found in neuronal cell bodies and axons. It is a marker of neuronal density and viability. Neuronal loss from disease and injury is associated with reductions in NAA levels. Choline (CHO) is involved in neuronal membrane synthesis and increased cellular turnover (i.e., in the case of tumor growth) and inflammation are associated with increased Cho levels. Creatine (Cr) is a marker of cellular energy metabolism. Cr levels are usually assumed to be stable, and are used to calculate metabolite ratios (i.e., NAA/Cr).

Myo-inositol (ml) is synthesized in glial cells (absent from neurons) and is a glial marker. Inflammation, which can involve glial proliferation, is marked by increases in ml. Glutamate (Glu) is a major excitatory neuro transmitter. It is stored as glutamine (Gln) in glia, and the Glu/Gln cycle is responsible for approximately 80% of cerebral glucose consumption. Glu and Gln peaks are difficult to separate, and are often reported together as Glx. High levels of Glu are toxic, leading to neuronal death. In these cases, Glu is the precursor of GABA (inhibitory neurotransmitter) and glutathione (GSH), which are both detectable using MRS. Lactate (Lac) is a marker of anaerobic metabolism and is usually not detectable in a normal brain. Its signal appears as a doublet. Lac levels increase during anaerobic glycolysis, which occurs in conditions such as ischemia and inflammation, and also accumulates in cysts. An ever-growing list of metabolites that can be measured are shown in Table 1 below.

TABLE 1

| | |
|---|---|
| Acetate | β-Hydroxybutyrate |
| N-Acetylaspartate | Myoinositol |
| Adenosine triphosphate | Scylloinositol |
| Alanine | Lactate |
| y-Aminobutyric acid Ascorbic acid (vitamin C) | Lipid (IMCL/EMCL) |
| Aspartate | Macro molecules |
| Choline | Phenylalanine |
| Creatine | Phosphocreatine |
| Ethanolamine | Phosphorycholine |
| Glucose | Phosphorylethanolamine |
| Glutamate | Pyruvate |
| Glutamine | Serine |
| Glutathione | Succinate |
| Glycerol | Taurine |
| Glycerophosphocholine | Threonine |
| Glycine | Tryptophan |
| Histamine | Tyrosine |
| Histidine | Valine |
| Homocarnosine | 2-hydroxyglutarate |

In various embodiments, the disclosure describes a system and methods of monitoring disease progression using validated chemical changes in important regions of the brain. These changes be evaluated using the analytes above, ratios of such analytes, and other parameters. The analysis system uses a machine learning based spectroscopy system for classification and analytics by using computer vision, brain atlases, and classified spectra to provide complex analysis of the data. In various cases, the analysis system uses a large dataset of diseased and normal spectra for key brain metabolites as seen when affected by various diseases to provide a detailed level of neurochemical information on various diseases of and/or in the brain.

In various embodiments, the disclosure describes an analysis system in communication with cloud resources and one or more MRI devices. In these cases, the analysis system receives MRI and MRS data from one or more scans from an MM device. The analysis system parses and decodes the MRS data based on which type of MRI device acquired the MRS data. The analysis system analyzes then filters, processes, and classifies the MRS data for reporting. In various embodiments, during processing of the MRS data, each spectroscopy voxel is co-registered to the imaging coordinates present in the DICOM image obtained from the MRI scan. The coordinates parsed from the spectroscopy data is generally transformed to imaging coordinates that can be displayed as pixel locations on a DICOM image. This transformation occurs for both the axial plane of the spectroscopy as well as the voxel or grid in which the data was acquired.

In various embodiments, an analysis system utilizes a large database of diseased and normal spectra to analyze MRS data. The analysis system is capable of distinguishing various signals within MRS data that would be missed by conventional imaging methods, which provides the capability of earlier intervention and better patient quality of life. The detection of key metabolites in the brain by magnetic resonance spectroscopy (MRS) can be used to determine the progress of various diseases. In various embodiments, an MRS scan is sensitive to key metabolic abnormalities in various diseases, which provides the capability to generate disease specific metabolic profiles, allowing for more precise diagnosis.

Use of MRS scans, and resulting data, facilitates monitoring changes in brain biochemistry through a course of treatment and can be correlated with treatment outcomes. In some cases, the information related to treatment outcomes, can be used to understand responsiveness to drugs and to better understand disease biochemistry and pathology. Typically, pathology precedes detectable symptoms. Specifically, patents experience brain changes even when are cognitively normal. The analysis system provides the capability view data to determine whether a patient is transitioning to a mild cognitive impairment or towards an advanced stage of a disease.

In various embodiments, the analysis system provides a graphical user interface (GUI) showing correlation of MRS data to MRI data. The analysis system can overlay and correlate color maps of various metabolites on top of each image obtained from the MRI scans. The analysis system is capable of selecting one or more voxels in the data to determine specific metabolite concentrations.

FIG. 1 is a simplified diagram of an analysis system working in conjunction with an MRI device and cloud resources, in accordance with an embodiment of the disclosure. As shown, the analysis system 110 includes hardware resources 115, analysis module 120, and data storage 125. The data storage 125 includes at least one data volume 130, which is capable of storing one or more libraries of MR spectra, data to be processed, and/or data that has already been processed. The analysis system 110 is in communication with an MM device 105 and cloud resources 135. The MM device 105 is capable of acquiring MRI images and MRS data associated with one or more patients. The MM device 105 sends the MRI images and MRS data to the analysis system 110 for analysis and reporting. The analysis modules 120 utilize hardware resources, data storage 125, and cloud resources 135 to facilitate analysis of data received from the MRI device 105. In various embodiments, the cloud resources 135 includes data storage 140A, 140B, 140C which include one or more libraries of MR spectra that can be used to analyze data and images received from the MM device 105. Upon completion of analysis, the analysis system 110 is capable of outputting reports using a local or remote display 145. The system of FIG. 1 can include one or more software modules for managing ranges, bounds, and other parameters used to define and display a visual representation of MRS data, such as color map having specific ranges and bounds to establish how the data is categorized (low, high, indeterminate, etc.) and displayed.

Figure 2:
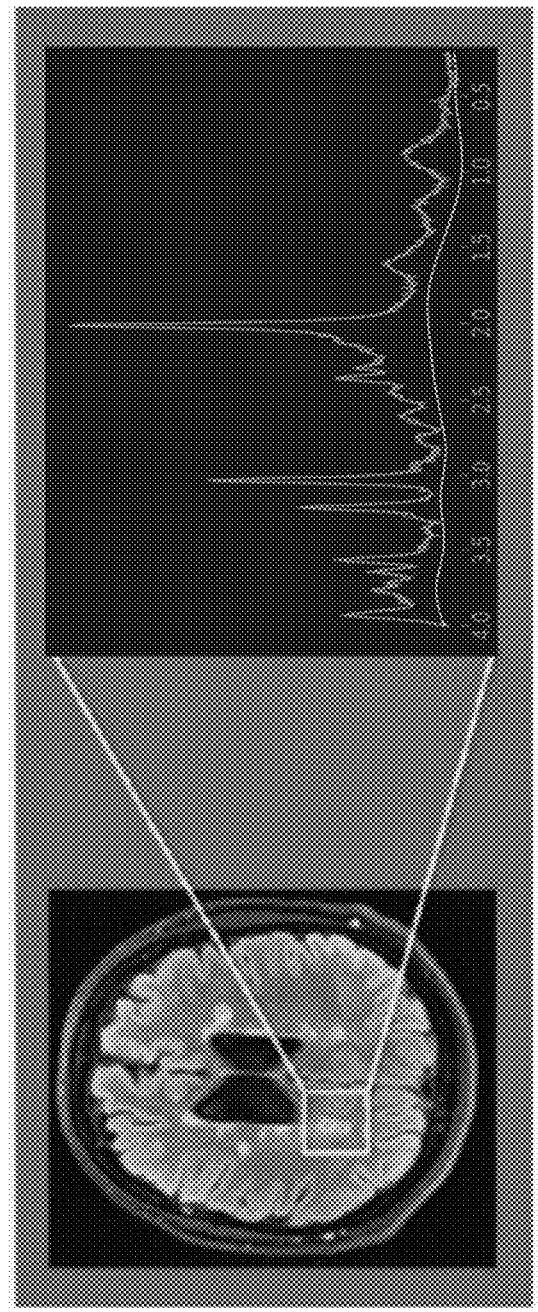
FIG. 2 is an image showing the correlation of a voxel to magnetic resonance spectroscopy data, in accordance with an embodiment of the disclosure.

FIG. 2 is an image showing the correlation of a voxel (also referred to as a region or brain specific region) R to magnetic resonance spectroscopy data, in accordance with an embodiment of the disclosure. As shown, the single voxel correlates to a plurality of peaks indicating various metabolites. Given the complexity of the spectra shown to the right, establishing visual representations of co-registered spectral data as part of a visually understandable co-registered display of MRS and MRI derived data is much easier to use and make informed diagnostic decisions. The plotted spectrum S is represented by the x axis that corresponds to the metabolite frequency in parts per million (ppm) according to the chemical shift, and the y axis that corresponds to the peak amplitude. The position on the x-axis of the metabolite peaks reflects the local chemical and magnetic environment of the molecule. The y axis corresponds to the peak amplitude in arbitrary units. This approach generally applies to the spectrum displayed in the figures of the disclosure unless otherwise noted.

Figure 3:
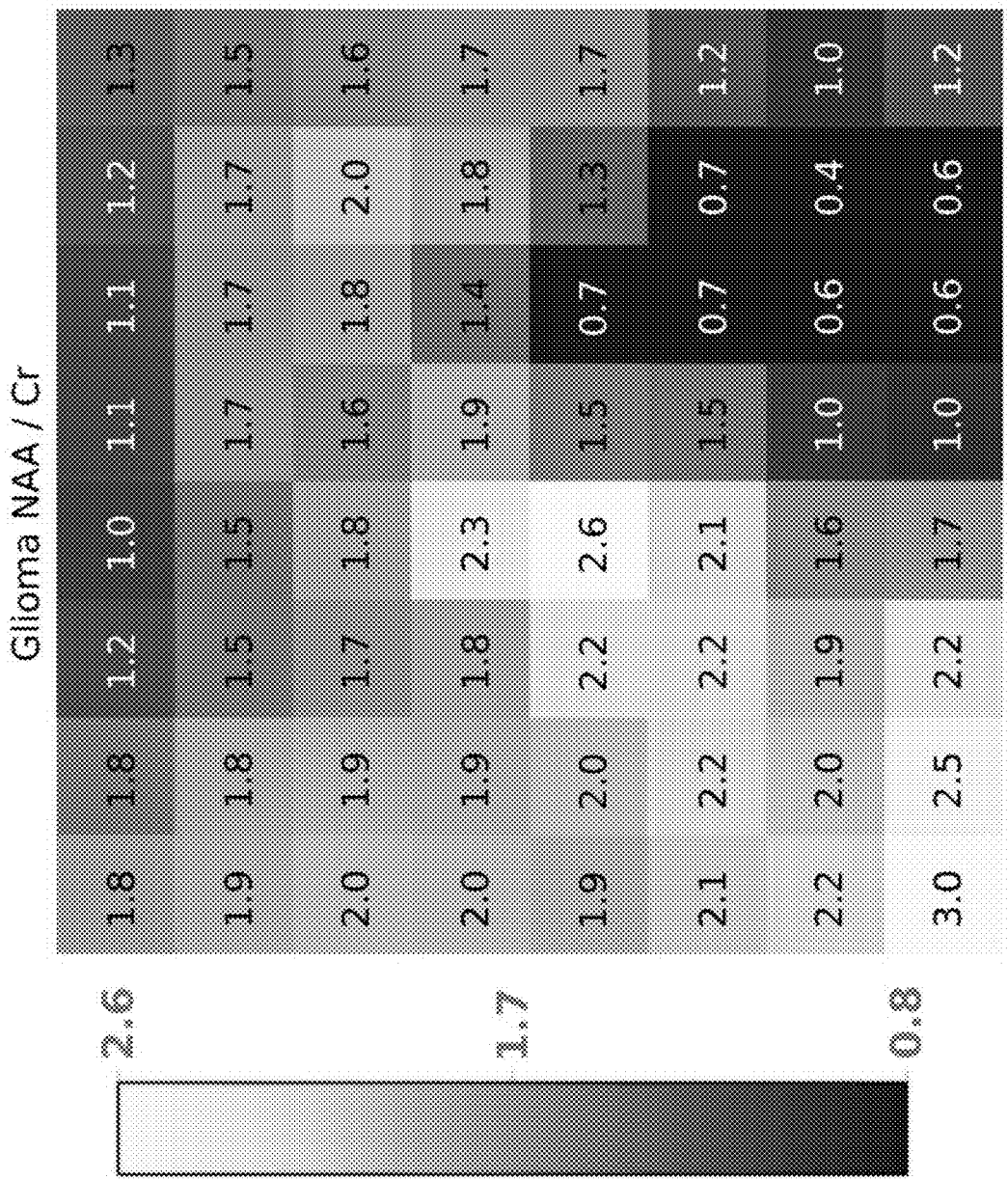
FIG. 3 shows exemplary images of color maps produced by the analysis system, in accordance with an embodiment of the disclosure

FIG. 3 shows exemplary images of color maps produced by the analysis system, in accordance with an embodiment of the disclosure. The extreme values of the color map signifying high and low levels of metabolite values are shown to indicate abnormalities in the tissue.

Figure 4:
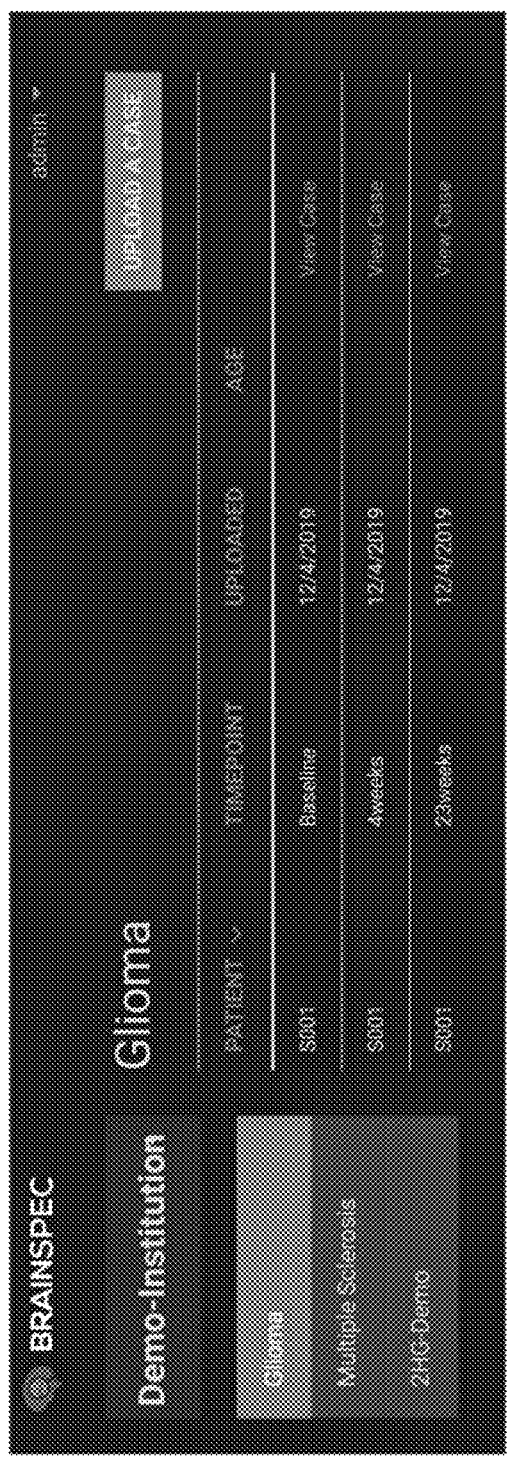
FIG. 4 shows a graphical user interface of a Magnetic Resonance Spectroscopy (MRS) system, in accordance with an embodiment of the disclosure.

FIG. 4 shows a graphical user interface of a Magnetic Resonance Spectroscopy (MRS) system, in accordance with an embodiment of the disclosure. FIG. 4 shows an initial navigation page where each available case is shown. Each patient is capable of having one or multiple scans associated with them. In this exemplary embodiment, analysis relating to 2-hydroxyglutarate (2HG) in the brain is depicted using MRS and MRI data sets. 2HG is the oncometabolite produced in neoplasms harboring a mutation in the gene coding for isocitrate dehydrogenase (IDH). These individual records can be selected to move to other user interface pages such as FIG. 5A and others.

Figure 5A:
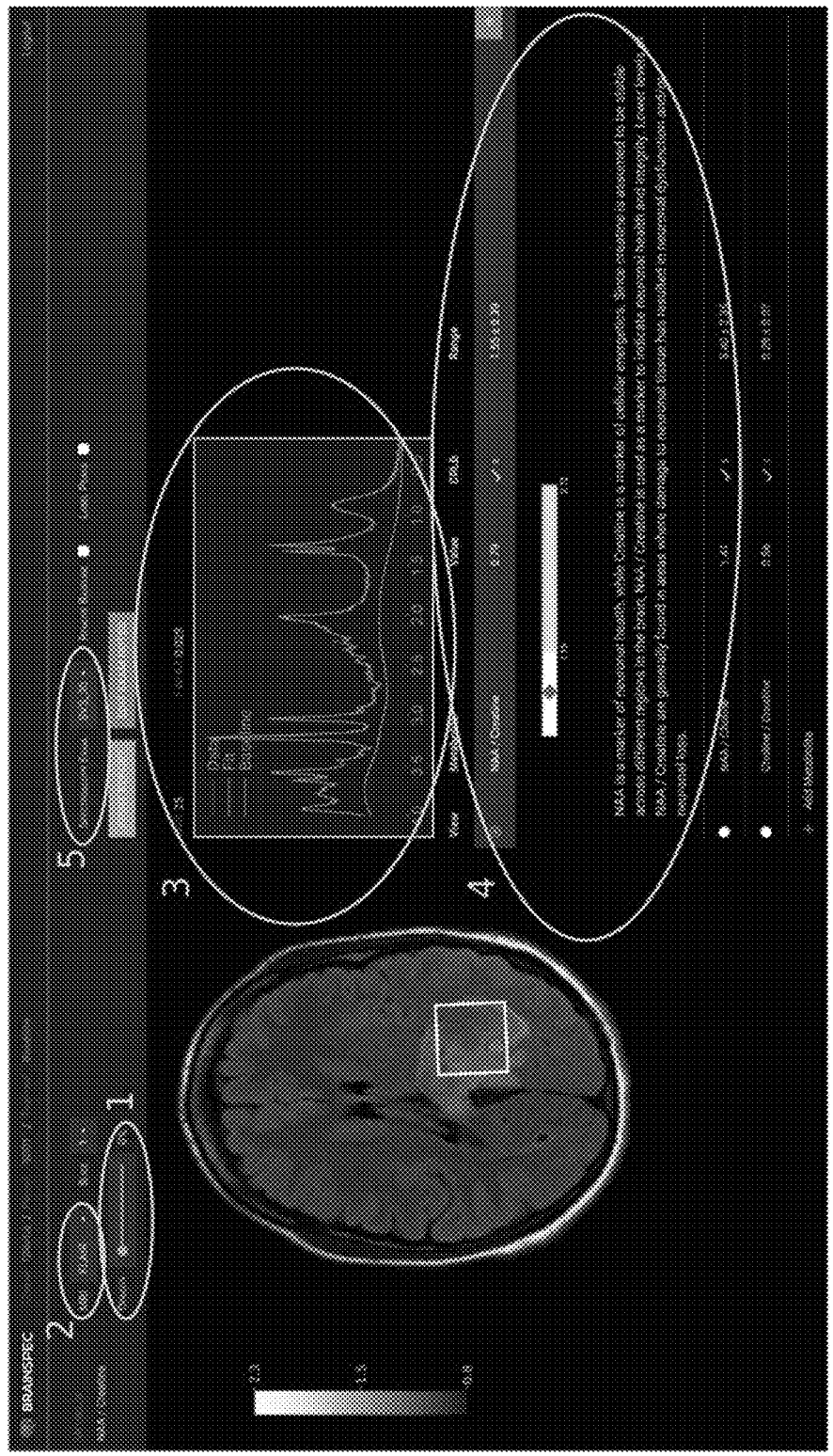
FIGS. 5A-5B show a display of an analysis using an analysis system, in accordance with an embodiment of the disclosure.
Figure 5B:
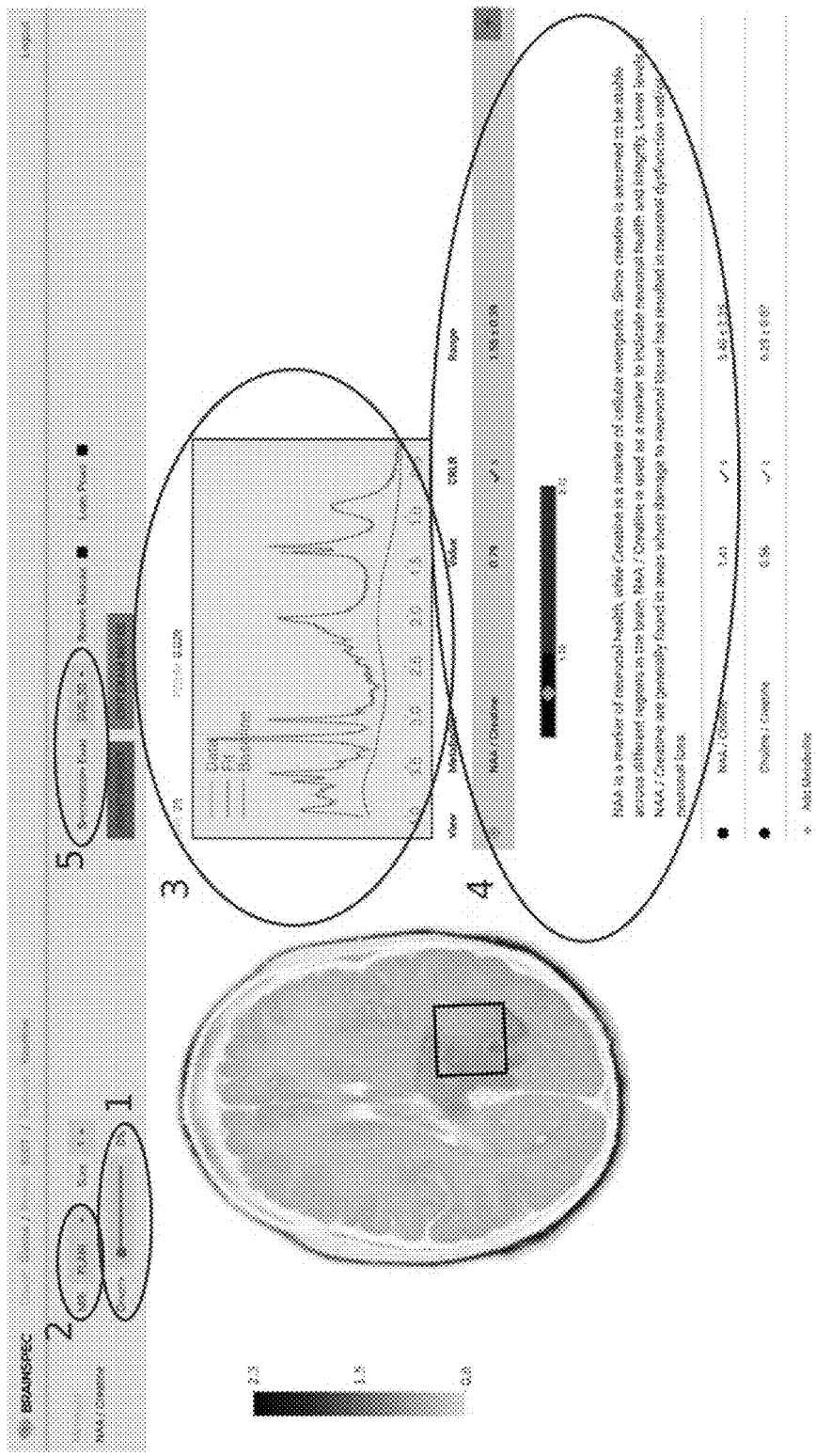

FIG. 5A shows a display of an analysis using an analysis system, in accordance with an embodiment of the disclosure. In this embodiment, the analysis system provides various selectors to determine which portion of the analyzed data is shown. For example, in this embodiment, there is an opacity selector (1), and MRI selector (2), and a Spectroscopy Exam selector (5). The selectors can be adjusted or modified by user interaction using a touch screen, mouse, or other input/control device. With the opacity selector (1), a user can make the color map transparent to view each underlying voxel. With the MRI selector (2), the analysis system can show changing underlying MRI. With the spectroscopy exam selector (5), the analysis system can change the underlying data to other available data sets associated with the respective patient. In this embodiment, a user has selected NAA/Creatine (4) and a single voxel. As a result, the spectra (3) is shown. In this case, the spectra shows experimental data, model fit, and baseline data. FIG. 5B shows the display of FIG. 5A, but using an alternative color scheme and indicia for identifying features, regions, spectra, measurements and other parameters of interest.

Figure 6A:
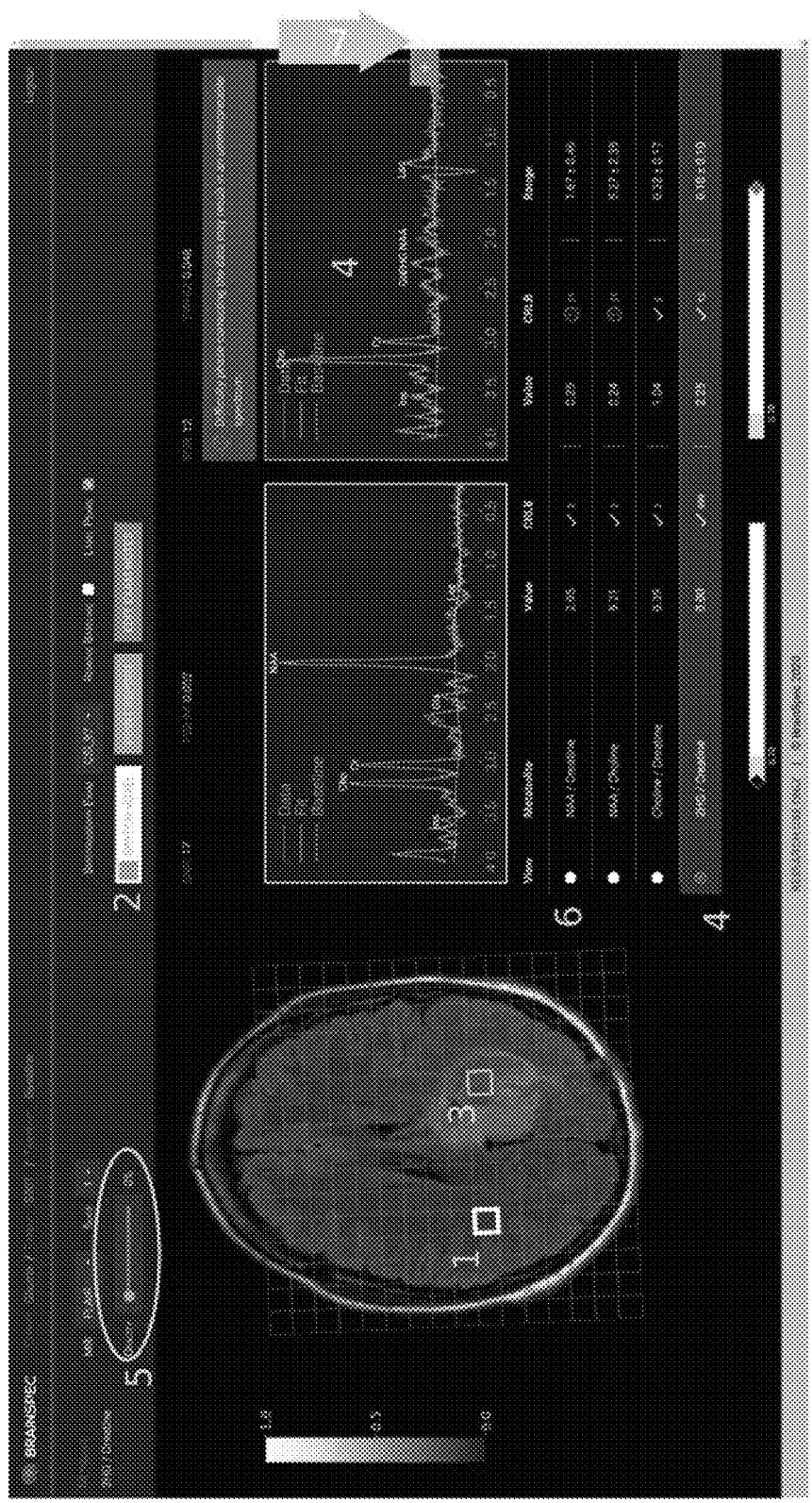
FIGS. 6A-6B show a display of a comparison of two voxels using an analysis system, in accordance with an embodiment of the disclosure.
Figure 6B:
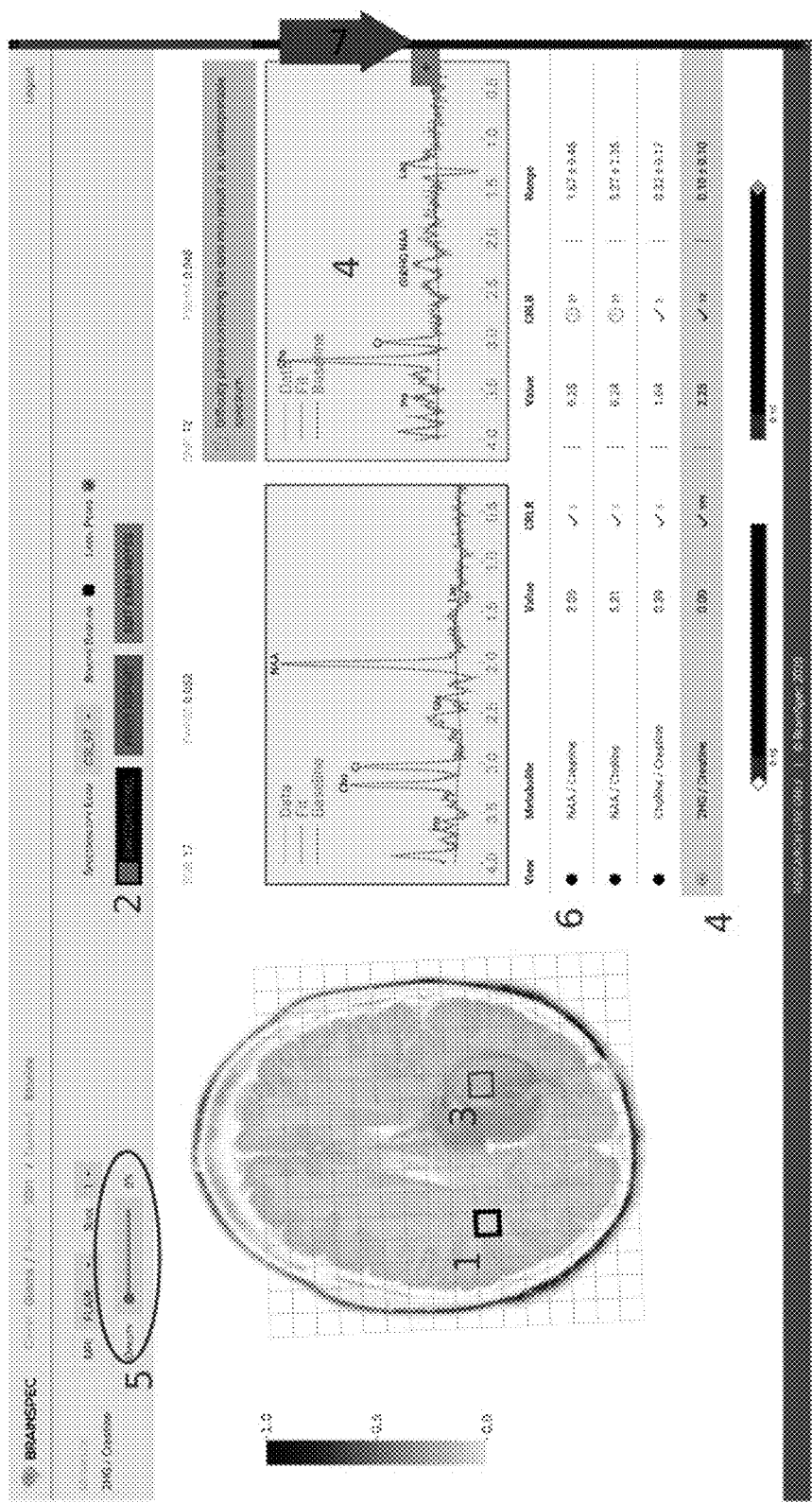

FIG. 6A shows a display of a comparison of two voxels using an analysis system, in accordance with an embodiment of the disclosure. In this embodiment, a metabolite is selected, which switches the color map overlaid to the one associated with the metabolite. The opacity is set to zero, to provide access to allow analysis of individual voxels. A first voxel (1) is chosen and selected to display on the left and a second voxel (3) is chosen and selected to display on the right. FIG. 6B shows the display of FIG. 6A, but using an alternative color scheme and indicia for identifying features, regions, spectra, measurements and other parameters of interest. Various components of the color map such as individual voxels or regions may be user selected to reveal further detail such as spectra or other data for various analytes relative to the selected region or voxel.

Figure 7A:
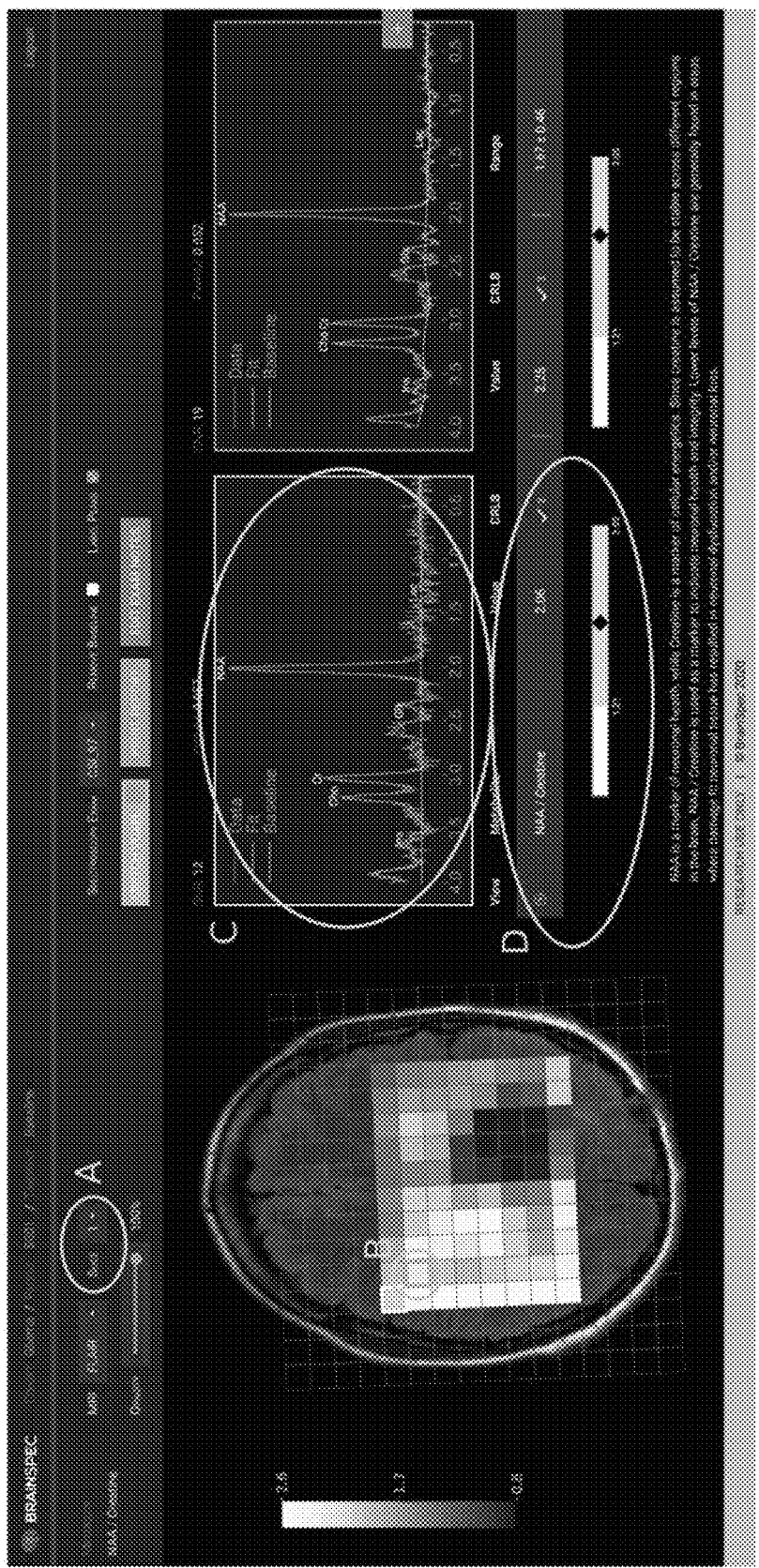
FIGS. 7A-7B shows an alternate display of MRS data using an analysis system, in accordance with an embodiment of the disclosure.
Figure 7B:
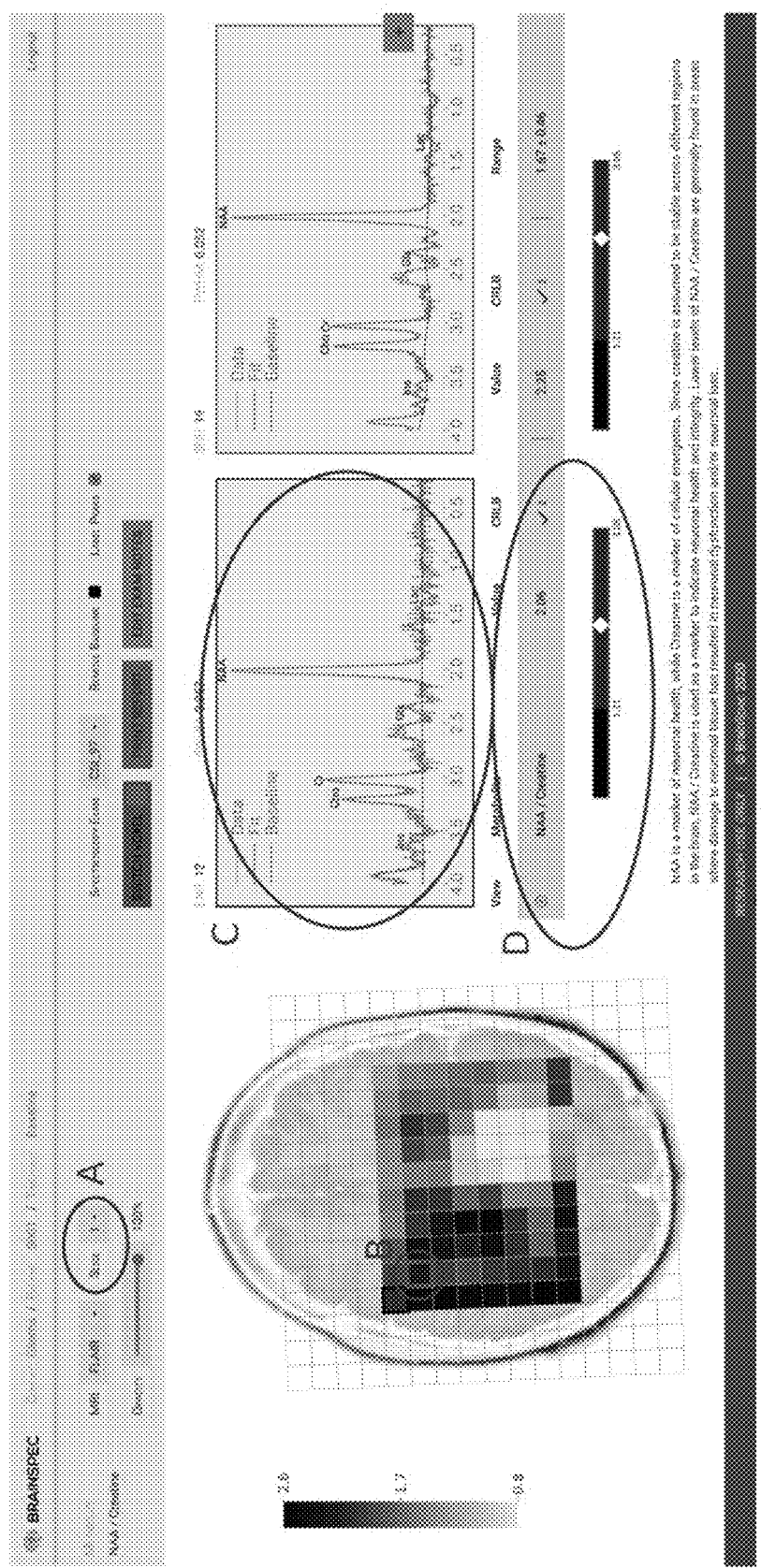

FIG. 7A shows an alternate display of MRS data using an analysis system, in accordance with an embodiment of the disclosure. In this embodiment, a user selects a region of interest by selecting a DICOM aligned slice (A) in the axial plane and a voxel displayed in the grid (B) depending on the patient's anatomy, brain region, and suspected condition. The corresponding spectra (C) and quantified values (D) are updated as the user selects various voxels or regions within the color map. In various embodiments, a user can add a list of metabolites or metabolite ratios to include in the analysis for quantification. FIG. 7B shows the display of FIG. 7A, but using an alternative color scheme and indicia for identifying features, regions, spectra, measurements and other parameters of interest.

Figure 8A:
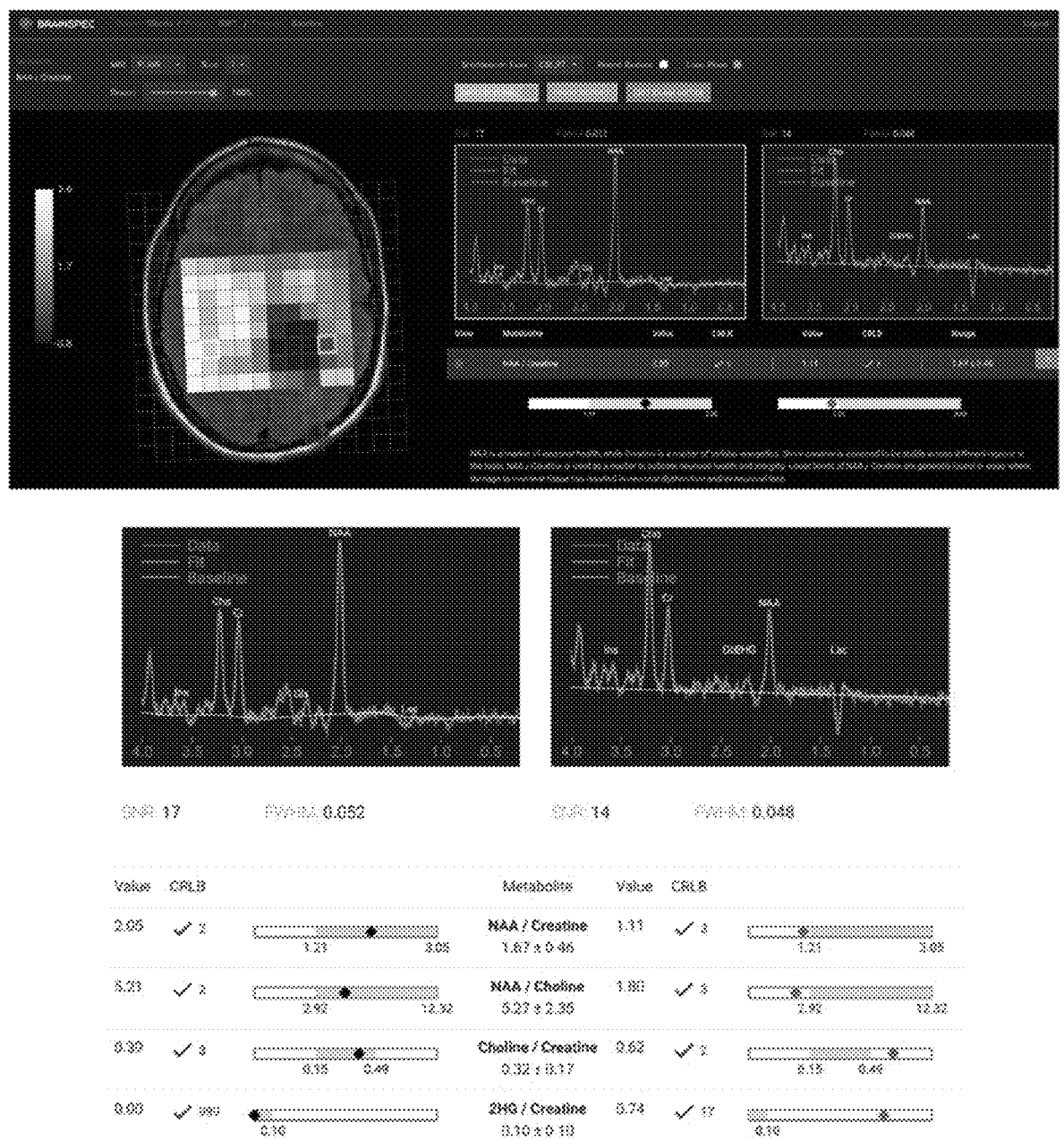
FIGS. 8A-8B shows an alternate display of analysis of MRS data, in accordance with an embodiment of the disclosure. In this embodiment, each metabolite of two different voxels are compared side by side.
Figure 8B:
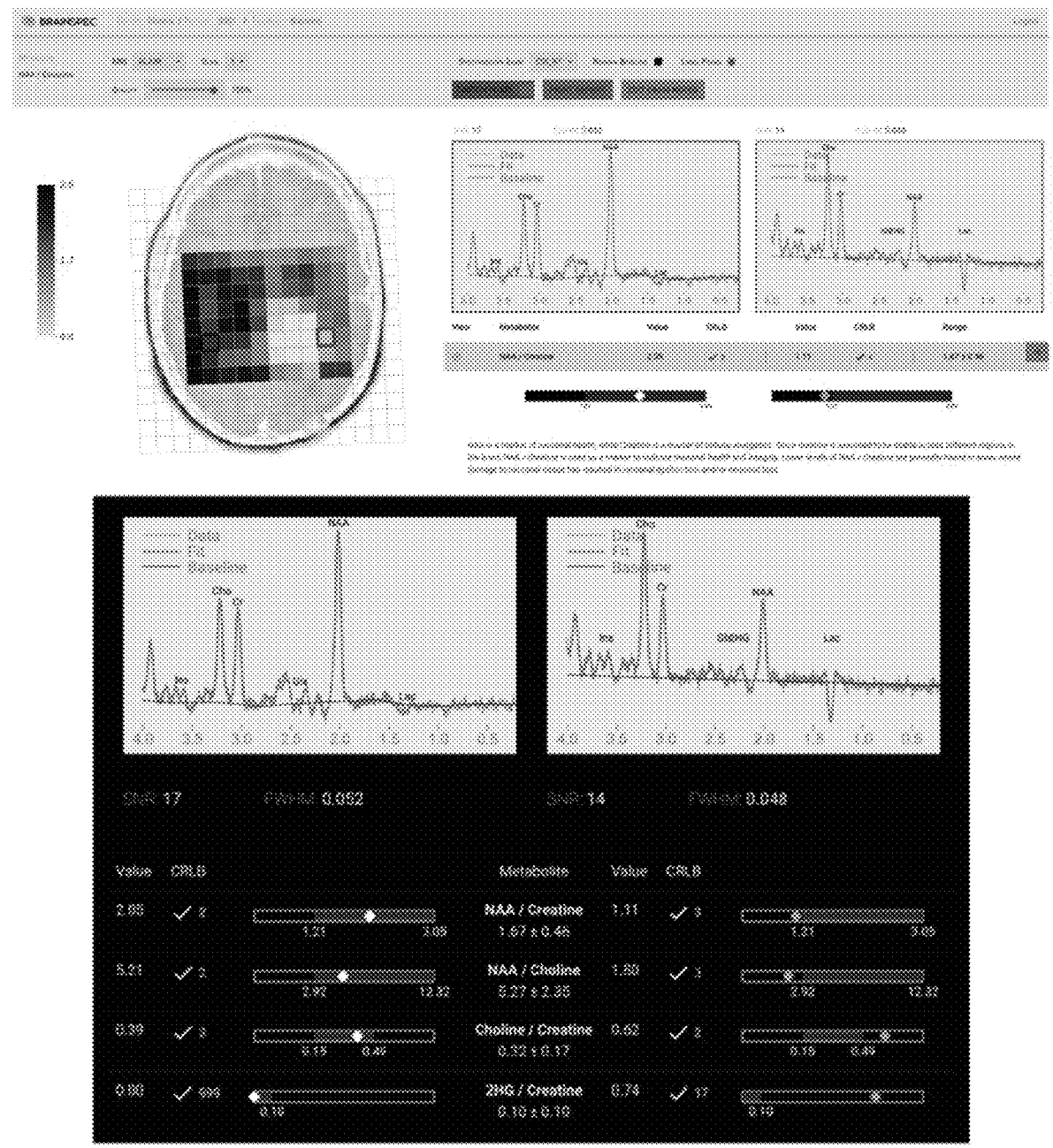

FIG. 8A shows an alternate display of analysis of MRS data, in accordance with an embodiment of the disclosure. In this embodiment, each metabolite of two different voxels are compared side by side. In addition to graphs associated with each selected metabolite, the total number and respective value of each metabolite can be shown side by side. FIG. 8B shows the display of FIG. 8A, but using an alternative color scheme and indicia for identifying features, regions, spectra, measurements and other parameters of interest.

Figure 9A:
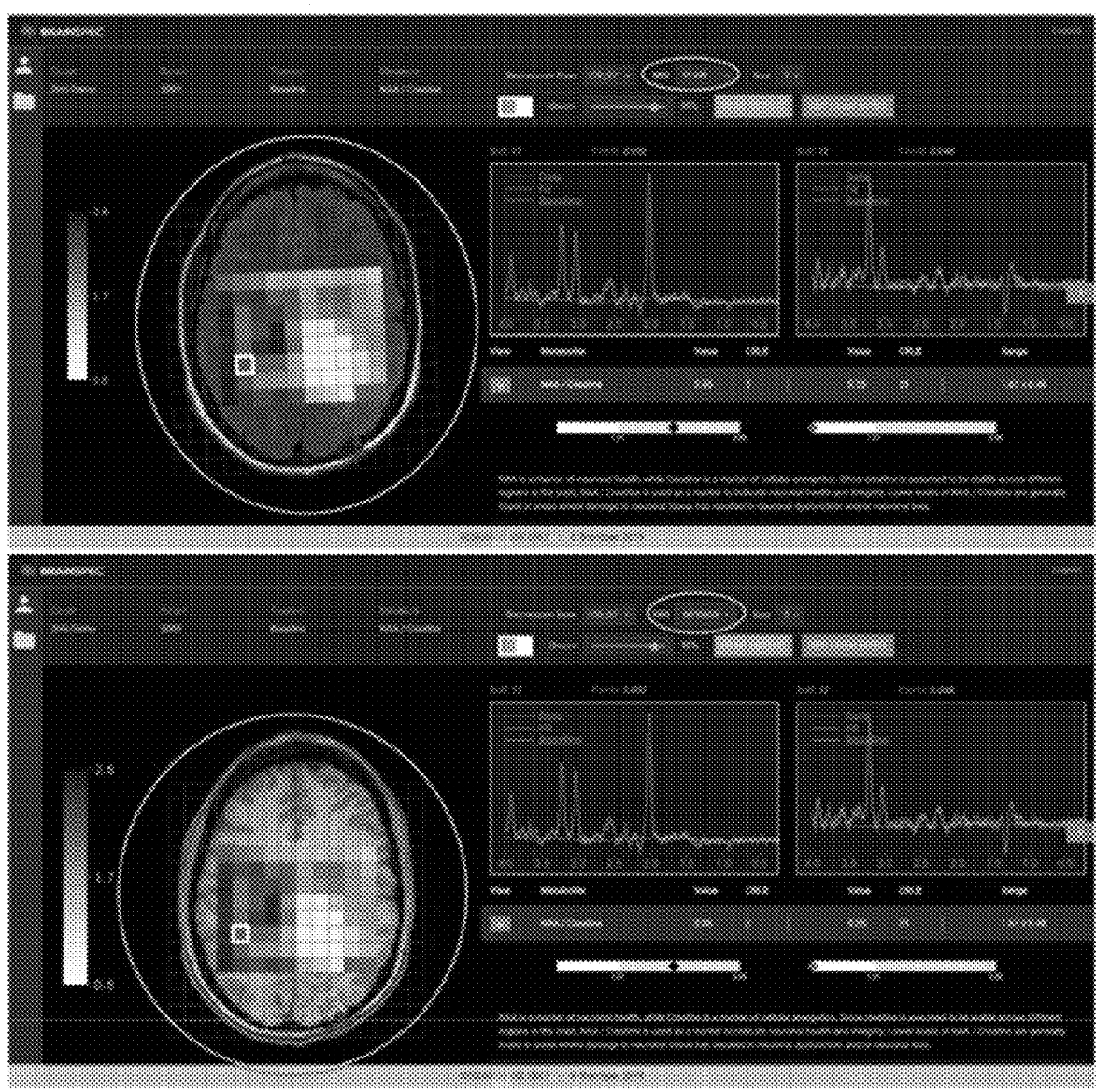
FIGS. 9A-9B shows an analysis of MRS data using an analysis system, in accordance with an embodiment of the disclosure.
Figure 9B:
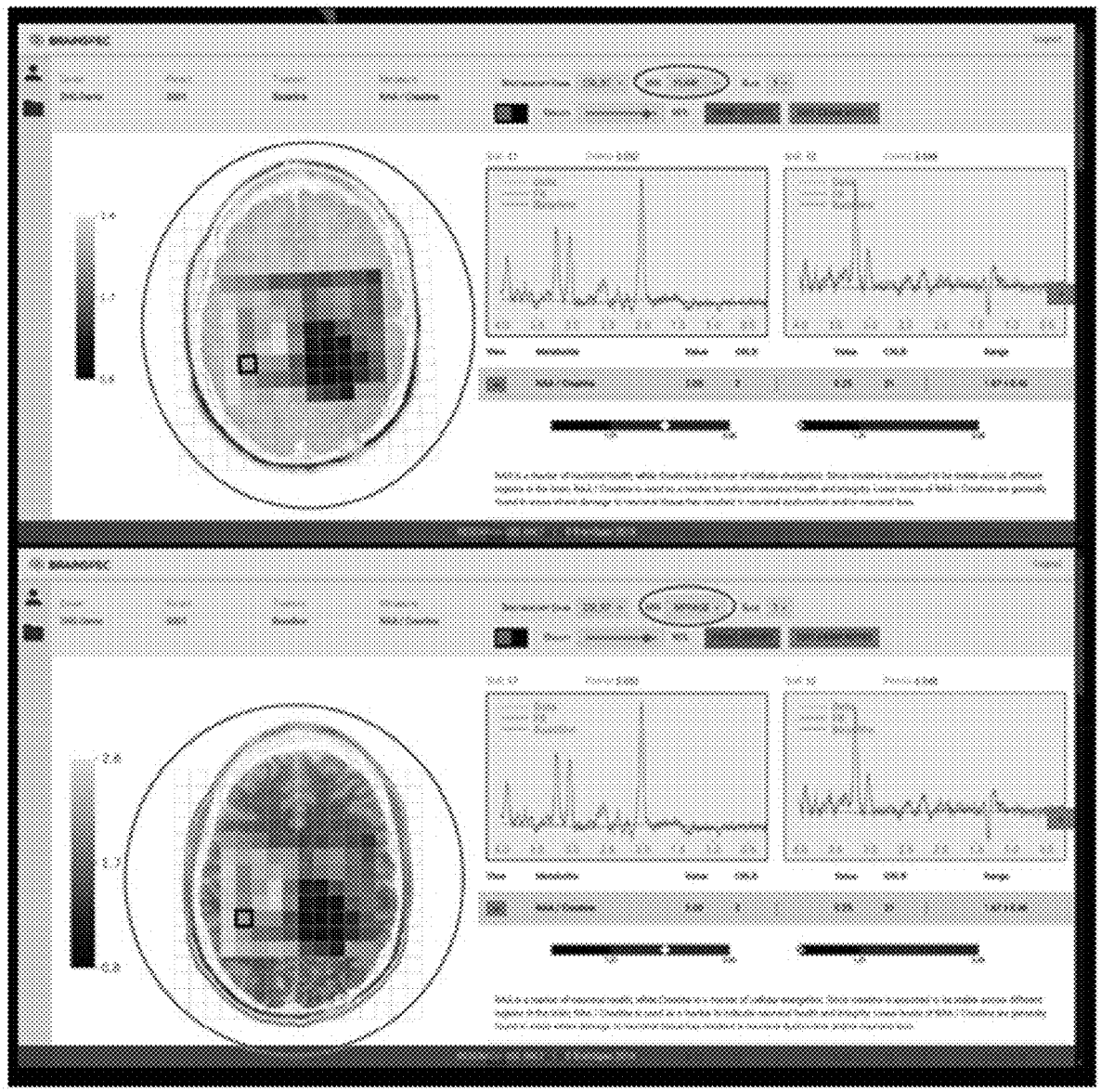

FIG. 9A shows an analysis of MRS data using an analysis system, in accordance with an embodiment of the disclosure. In this embodiment, the analysis system reads in spectroscopy and DICOM header variables and performs image co-registration to align and display spectroscopy data in correct region of DICOM image. DICOM images are sorted by protocol and selected by matching the location in the axial plane. A user can change between selected DICOM protocols, which will cause the corresponding image and grid alignment to update. FIG. 9B shows the display of FIG. 9A, but using an alternative color scheme and indicia for identifying features, regions, spectra, measurements and other parameters of interest. A selected region or voxel is shown by the dark reticle on left.

Figure 10A:
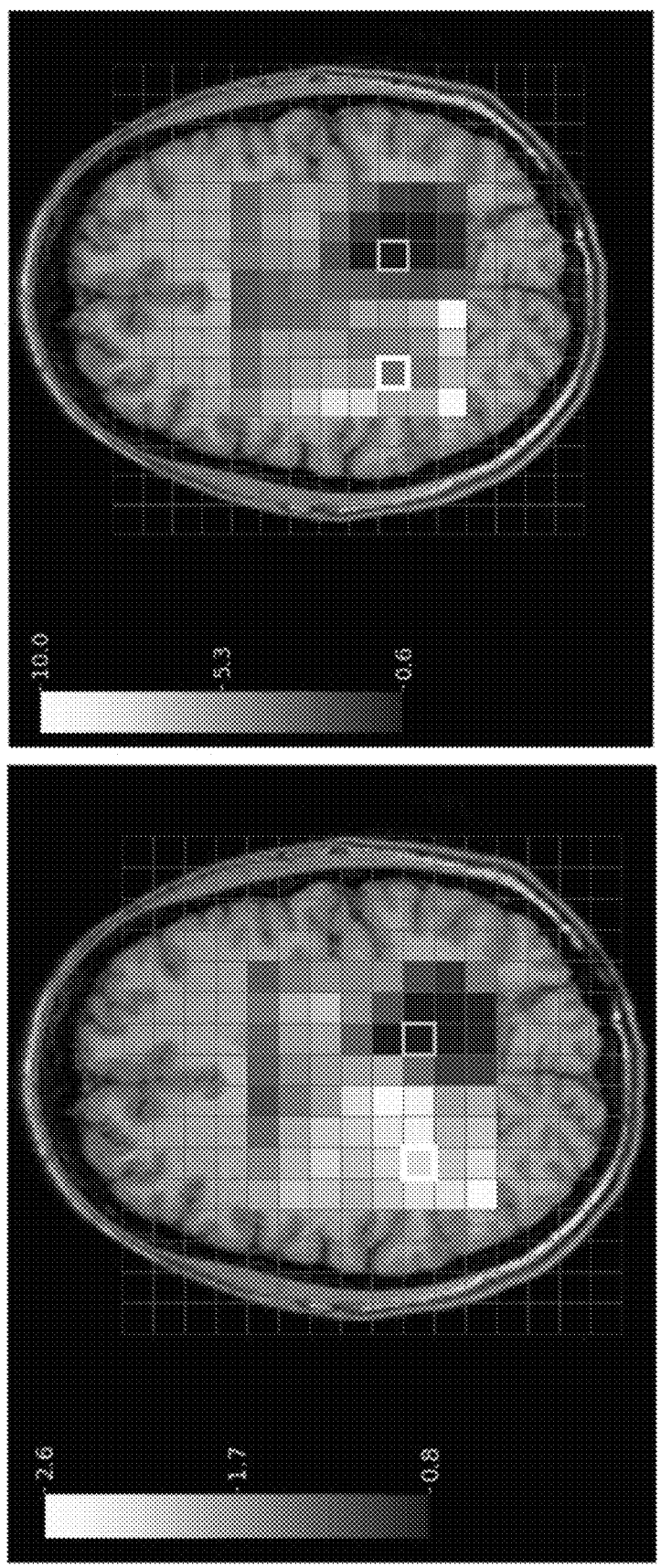
FIGS. 10A-10B shows bounded color maps overlaid upon DICOM images, which are MRI images as shown, in accordance with an embodiment of the disclosure.
Figure 10B:
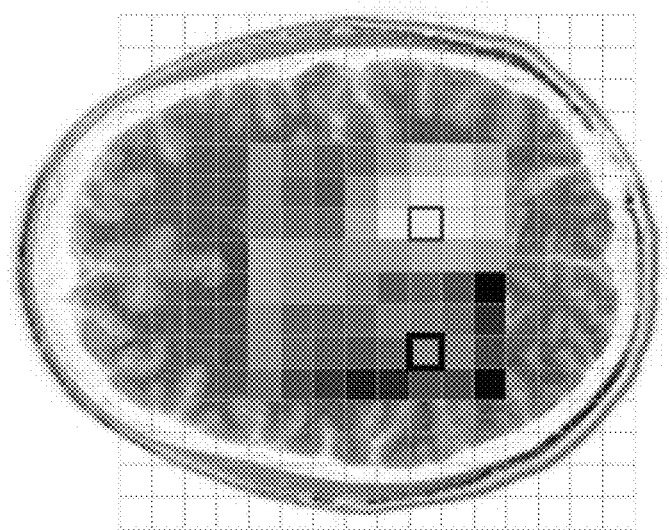
Figure 10B:
Figure 10B:
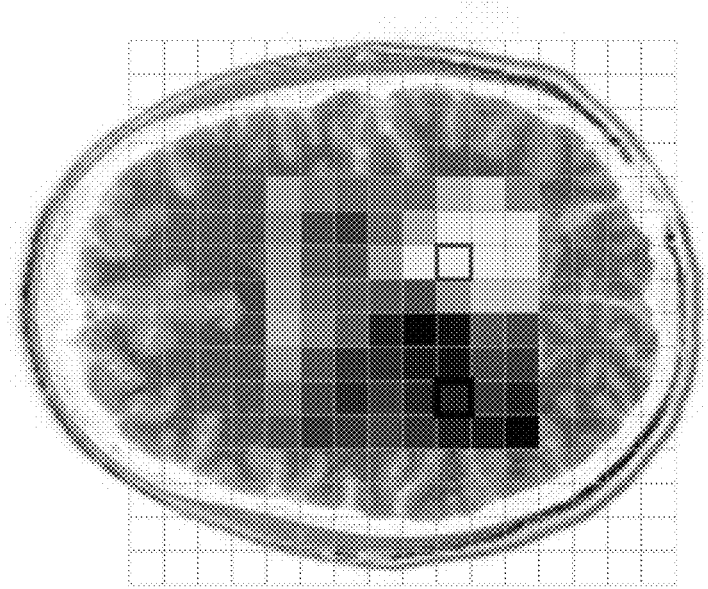
Figure 10B:

FIG. 10A shows bounded color maps overlaid upon DICOM images, which are MRI images as shown, in accordance with an embodiment of the disclosure. In this embodiment, color maps are drawn using ranges selected by taking into account multiple parameters, including metabolite profile, patient age, echo time, and field strength of the MRI. Ranges are generated using statistical analysis of healthy control data to create bounds for upper, lower, and reference ranges for the metabolite ratio selected. FIG. 10B shows the display of FIG. 10A, but using an alternative color scheme and indicia for identifying features, regions, spectra, measurements and other parameters of interest.

FIG. 11 shows range bars of various metabolites, in accordance with an embodiment of the disclosure. Depending on the selected metabolite, a high or low concentration may indicate the presence of a disease of neurological condition. In this embodiment, metabolite range bars are generated using multiple parameters, including: metabolite profile, patient age, echo time, and field strength of the Mill. Gray range indicates a window of healthy control data. Metabolites are classified into one of three permutations of displays. (A) Abnormal data is below the given threshold, (B) abnormal data is either above or below the given threshold, or, (C) abnormal data is above given threshold.

Figure 12:
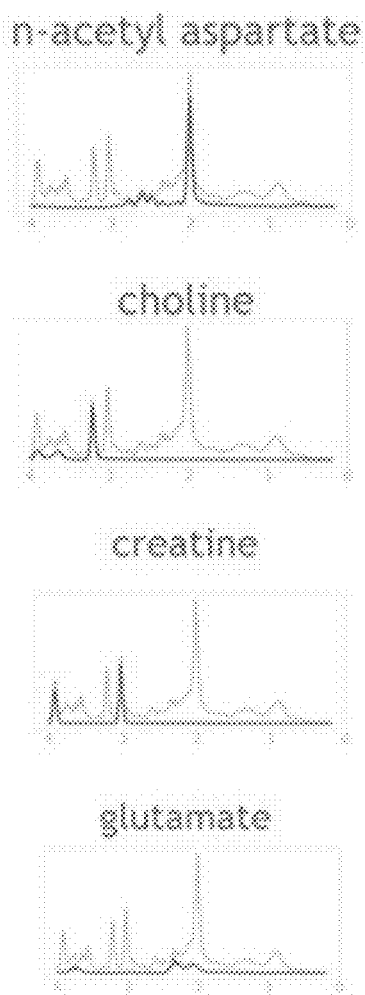
FIG. 12 shows various displays of metabolites individually isolated, in accordance with an embodiment of the disclosure.

FIG. 12 shows various displays of metabolites individually isolated, in accordance with an embodiment of the disclosure. As shown in this embodiment, the analysis system completes pre-processing steps and subtracts baselines so that individual metabolite peaks can be generated. Individual metabolite profiles are displayed as a component of the linear model solution so that users are able to view the relative composition of the linear model. In order to quantify the raw data, a mathematical model may be used to estimate the quantities of known metabolite peaks. The shape of each individual metabolite signal is known which is then modeled as a linear combination of the individual metabolite basis spectra. The darker profile spectrum shown in each display corresponds to the identified analyte shown relative to the linear combination of all the analyte spectra.

Figure 13:
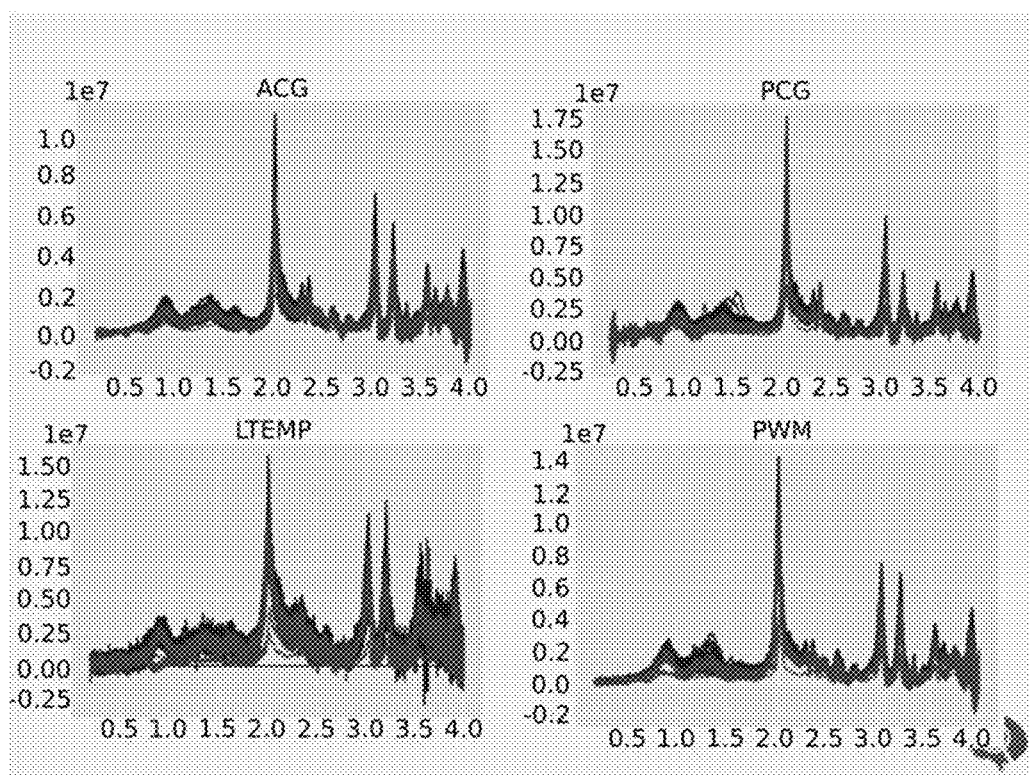
FIG. 13 shows a display providing selected profiles, in accordance with an embodiment of the disclosure.

FIG. 13 shows a display providing selected profiles, in accordance with an embodiment of the disclosure. As shown, a user is able to compare selected data to either a disease or reference data. By selecting and viewing the spectrum for a region of interest, multipole parameters, including brain region, disease profile, patient age, echo time, and field strength of Mill are used to generate a comparison spectrum. The "reference window" is displayed and plotted against the original spectrum selected. To ensure accuracy, the data is preprocessed with baseline subtracted in order to allow for comparison. The blue line is the model of the raw data (gray). The user can assess the fit of the model to the data by examining how closely the two lines are matched. The red line corresponds to the data.

Figure 14:
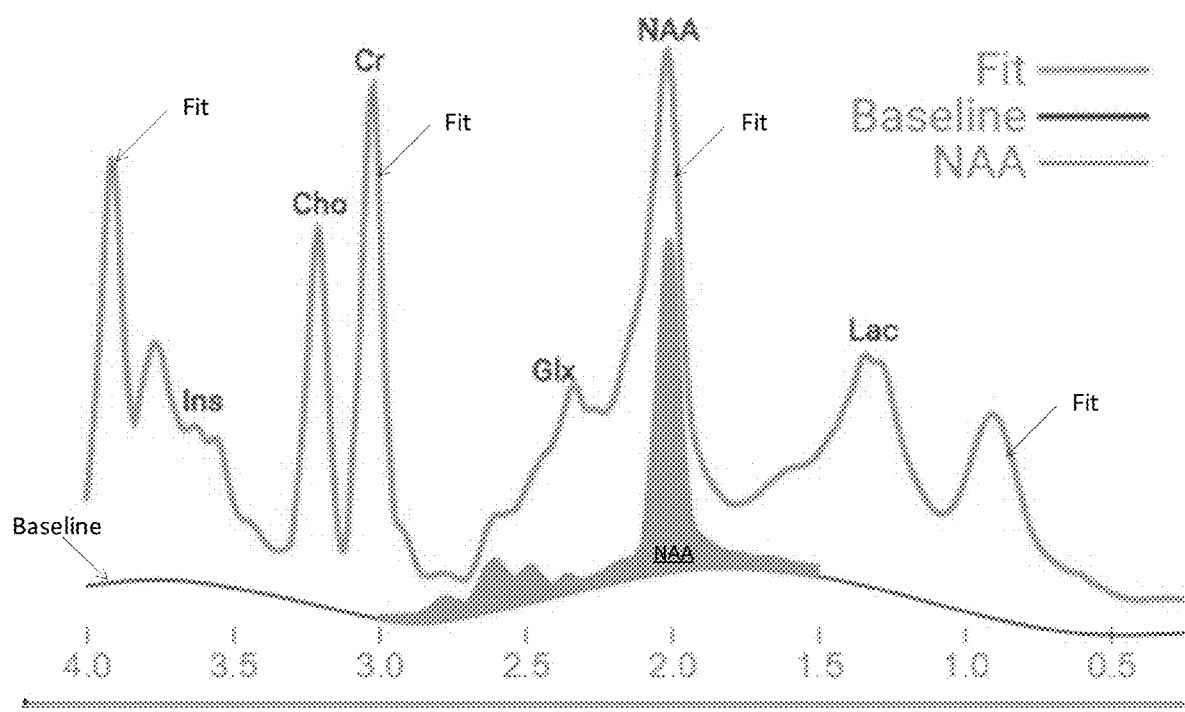
FIG. 14 shows an individual peak display of various metabolites with a baseline, a set of fit metabolite data, and a N-Acetylaspartate region in accordance with an embodiment of the disclosure.

FIG. 14 shows an individual peak display of a selected metabolite, in this example the N-Acetylaspartate peaks, along with a baseline, and a set of fit metabolite data. The systems and methods disclosed herein are also operable to isolate an individual metabolite to show a user the specific contribution of that peak to the model. In FIG. 14, the NAA peak is shown as a shaded region that may be emphasized using various indicia such as color or hatching. Since many peaks overlap and can be difficult to identify by sight along, this aids the end user by isolating the individual peak components. The baseline corresponds to the broad macromolecules present in the data and the fit corresponds to the overall model of all metabolites estimated.

Figure 15:
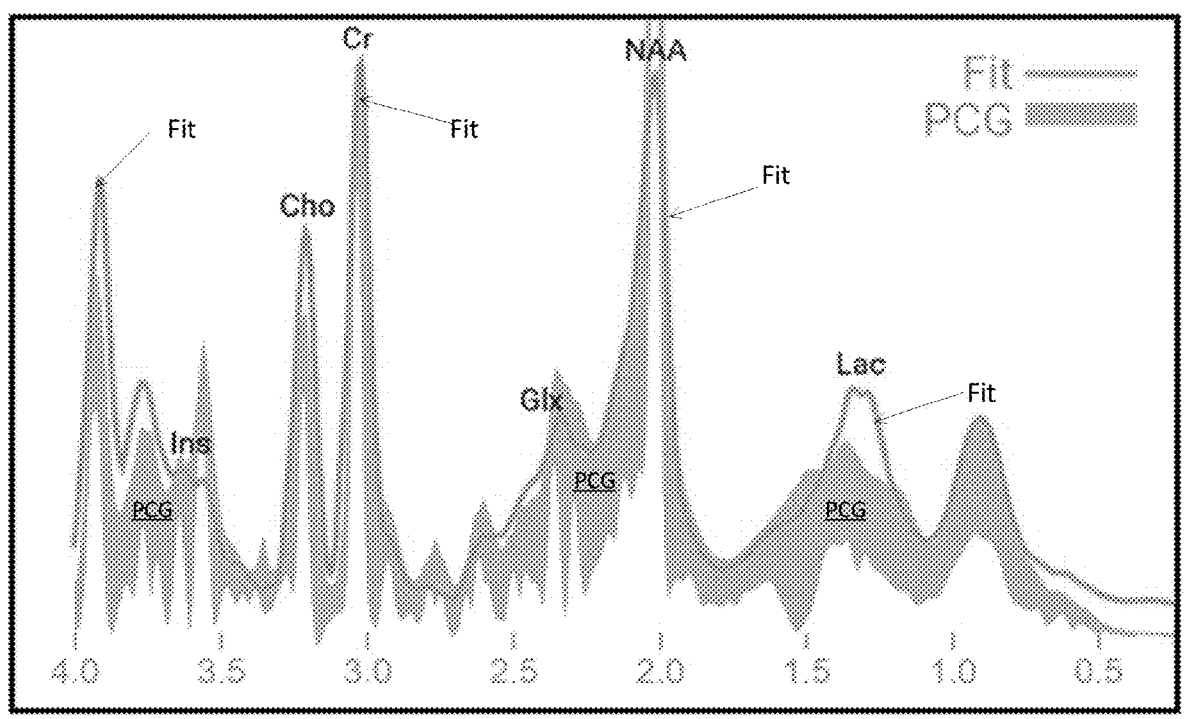
FIG. 15 shows a display comparing various spectra to a reference region in a healthy control subject in accordance with an embodiment of the disclosure.

FIG. 15 shows a display comparing various spectra to a reference region in a healthy control subject. The selected reference region corresponds to the posterior cingulate gyms, PCG, which is superimposed in comparison of the selected region. The selected data is scaled on the y-axis to allow comparison on reference data with the data of interest by using key metabolites as endpoints. This allows the end user to compare and contrast regions of increased or decreased metabolite peak height in order to identify abnormalities.

Data Quality Assessment

The software-based systems and methods disclosed herein uses various metrics to assess the quality of both the raw data uploaded by the user, and the metabolite concentration estimates presented after processing the data. Useable or good data may be segregated from poor or bad data based on various metrics and thresholds to filter data and categorized it. Additional details on such metrics is discussed below.

Spectral Quality Metrics

The quality of the raw data may be assessed via various metrics. Typically, raw data is acquired as a time series, while its spectrum is produced by application of the Fast Fourier Transform (FFT). These metrics are all properties of the data in the frequency domain.

Signal-to-Noise Ratio

The signal to noise ratio (SNR) indicates the power of the signal generated from the detected metabolites relative to the signal generated by background sources, such as the scanner equipment itself, electromagnetic activity in the environment, or data artifacts (such as patient movement). SNR can be improved by combining repeated acquisitions, and low SNR corresponds to poor data quality, as data processing depends on the presence of the metabolite-generated signal.

Spectral Lineshape Width

This metric estimates the width of the spectral peaks at half their maximum power (full width at half max, or FWHM), measured in parts-per-million. Inhomogeneity of the scanner's magnetic field (or poor shimming sequences that fail to correct such inhomogeneities) may result in inconsistent resonance frequencies, causing spectral peaks to widen. The effect is worsened by the presence of multiple metabolites with similar resonances.

Broad lineshapes hinder the analysis various system and method embodiments use for concentration estimation, which requires fitting linear combinations of basis spectra to the observed data. The peaks in the basis set are highly resolved (spectrally narrow). Thus, high FWHM values indicate poor quality data and prevent accurate concentration estimates.

Phase-Correction Values

MR spectroscopy signals are acquired in quadrature, and both the real and imaginary components of the signal are retained throughout analysis. Because the phase of the initial measurement in the time domain is not known, phase adjustment is required in the frequency domain to produce a spectrum whose real components correspond to absorption lineshapes. This adjustment is composed of a zero-order (constant) correction, and a first-order (linear with frequency) correction.

During development and testing of the various software-based systems and methods disclosed herein, it has been determined that large first-order corrections frequently result in spectra deemed poor-quality by spectroscopists. Thus, this metric a valuable indicator of data quality. In addition to the adjustment value itself, various system and method embodiments evaluate diagnostic messages that are displayed to the end user estimating the difficulty of phase adjustments; the presence of such messages affects the decision to alert the user to potentially poor data quality.

Convenience to User

In various embodiments, the systems and method disclosed herein may display both the SNR and FWHM of every spectrum viewed by the end user. The software/system may also make a threshold-based decision to display warning messages to the user if any of the metrics may indicate low-quality data, i.e. low SNR, high FWHM, or high first-order phasing. The warning messages are prominently displayed; their text indicates what metric is of concern, and that the results should be interpreted with caution. A given voxel may display warning messages for multiple metrics. This information enhances the user experience and may be used to provide alerts, alarms, or feedback regarding any value or metric disclosed herein.

Concentration Quality Metrics

The metabolite concentrations produced by he systems and method disclosed herein may are associated with an uncertainty, expressed as the Cramér-Rao lower bound (CRLB) of the estimate. CRLB is a well-known measure of the variance of a parameter estimate; it is derived from the inverse of the Fisher information of the estimate, and thus sensitive to the data, the estimate, and the model's likelihood function. A high CRLB indicates high variance and thus uncertainty about the estimated parameter.

Systems and methods disclosed herein considers the CRLB values expressed as percentages of the estimate itself. For example, a metabolite with concentration estimate of 4 mmol and a CRLB 2 mmol is given a about 50% CRLB value. Interpreted as a standard deviation, it may be doubled to give about 95% confidence interval. Thus, a CRLB of about 50% yields an interval from zero to twice the estimate, meaning the concentration cannot be considered reliable.

A large body of spectroscopy literature discusses appropriate CRLB thresholds for considering concentration estimates safe to interpret. Consensus suggests that estimates with CRLB value above about 20% should not be considered. This is the policy generally adopted in some of the system and method embodiments disclosed herein, but some metabolites not generally present in healthy brain tissue are given a threshold of 40% when displaying warnings to the user (see next section).

User Interface/Convenience Features

The CRLB (expressed as a percentage of the metabolite concentration) for every metabolite is displayed to the user, adjacent to the concentration or concentration ratio itself. If the CRLB is deemed sufficiently high, a checkmark icon is displayed next to the value. If not, a color-coded (although other indicia may be used) warning icon is displayed. The device's instructions for use detail the meaning of these indicators.

Although the disclosure is described in terms of MRI and MRS systems, various specific types of those systems and modes of operation for such systems can be used in various embodiments, single-voxel spectroscopy (SVS) may be used. SVS is acquired using three slice selective radiofrequency pulses where the intersection of the pulses defines the region of interest (ROI) or voxel resulting in a single spectrum for interpretation. Multivoxel spectroscopy, also called chemical shift imaging (CSI) overcomes this issue by adding an additional phase-encoding step that allows for spatial encoding of a larger volume such that it is divided into smaller voxels. CSI may also be used as a source of data for various embodiments of the disclosure. In addition, although the disclosure provides various examples directed to analyzing analytes in the brain, the systems and methods disclosed herein can be extended to other analyte containing tissues of interest, such as heart, breast, liver, and other tissue of other organ systems, without limitation. In addition, references to analytes may also include metabolites and vice versa.

The algorithms presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, an analysis or diagnostic system as disclosed herein may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. The analysis and diagnostic systems disclosed herein can be cloud-based, local servers, and integrated with health care systems such as PACS systems and other DICOM systems that include one or more computing devices. The various systems can connect, interface and receive data from various MM and MRS systems, without limitation.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation. Various artificial network configurations and machine learning systems may be used to analyze and process analyte data and data derived therefrom.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

When values or ranges of values are given, each value and the end points of a given range and the values there between may be increased or decreased by 20%, while still staying within the teachings of the disclosure, unless some different range is specifically mentioned.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

It is to be understood that the figures and descriptions of the disclosure have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the disclosure, a single component may be replaced by multiple components, and multiple components may be replaced by a single component, to provide an element or structure or to perform a given function or functions. Except where such substitution would not be operative to practice certain embodiments of the disclosure, such substitution is considered within the scope of the disclosure.

The examples presented herein are intended to illustrate potential and specific implementations of the disclosure. It can be appreciated that the examples are intended primarily for purposes of illustration of the disclosure for those skilled in the art. There may be variations to these diagrams or the operations described herein without departing from the spirit of the disclosure. For instance, in certain cases, method steps or operations may be performed or executed in differing order, or operations may be added, deleted or modified.

Unless specifically stated otherwise as apparent from the following discussion, it is appreciated that throughout the description, discussions utilizing terms such as "processing" or "computing" or "calculating" or "comparing", "training" or "generating" or "determining" or "imaging" or "applying" or "sampling" or "imaging" or "handling" or "receiving" or "co-registering" or "allocating" or "displaying" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The disclosure may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed:

1. A diagnostic image and spectroscopic system, comprising:
   an analysis system in communication with one or more sources of brain region spectroscopy data; and
   computer-executable logic, encoded in a memory device of the analysis system, for interpreting brain region spectroscopy data, wherein the computer-executable logic is configured for execution of:

(a) selecting a brain region for analysis, wherein the brain region is identified relative to imaging data;

(b) filtering the brain region spectroscopy data based on data-quality metrics selected from the group consisting of SNR, full width half max, Cramer-Rao lower bounds and phasing, wherein brain region spectroscopy data failing at least one data quality metric threshold is excluded from classification;

(c) generating one or more metabolite specific thresholds using a set of ranges of a plurality of parameters, the plurality of parameters comprising a (i) metabolite profile, (ii) a patient age, (ii) an echo time, and (iv) a field strength of magnetic resonance imaging (MRI), (d) classifying the filtered brain region spectroscopy data according to the one or more metabolite specific thresholds into high, low, or within a normal range;

(e) processing the filtered brain region spectroscopy data to obtain one or more spectroscopic graphical representations of the brain region spectroscopy data;

(f) co-registering the one or more spectroscopic graphical representations with regions of interest in imaging data obtained relative to brain tissue, wherein the imaging data is obtained simultaneously with the brain region spectroscopy data; and (g) displaying a first visual representation of the classified co-registered brain region spectroscopy data with imaging data, wherein the first visual representation comprises
one or more sectional or three-dimensional views of brain tissue, a set of indicia corresponding to the one or more metabolite specific thresholds that indicate the classification, and
a spatially correlated map of changes in brain region spectroscopy data.

2. The system of claim 1, wherein the one or more metabolite specific thresholds corresponding to an upper and/or lower threshold are generated using one or more ranges based on the metabolite concentration or metabolite ratio to creatine.

3. A diagnostic image and spectroscopic system, comprising:
an analysis system comprising an analysis module, a data storage, and one or more hardware resources, in communication with one or more sources of brain region or brain tissue-specific spectroscopy data; and
computer-executable logic, encoded in a memory device of the analysis system, for interpreting brain region or brain tissue-specific spectroscopy data, wherein the computer-executable logic is configured for execution of:
decoding magnetic resonance imaging (MRI) vendor specific proprietary spectroscopy data format for multiple MRI devices using a unique file format such that the data from different MRI device may be used by the analysis system;
processing the brain region or brain tissue-specific spectroscopy data to obtain one or more spectroscopic graphical representations of the brain region or brain tissue-specific spectroscopy data from multiple MRI device vendors;
classifying the brain region or brain tissue-specific spectroscopy data into a classification of increased, decreased, or within a selected range by generating a metabolite specific threshold based on one or more ranges for each of a metabolite profile, patient age, echo time, and field strength of MRI;
determining indicia corresponding to reference ranges for a metabolite, wherein one or more of the ranges are determined using one or more range parameters;
co-registering the one or more spectroscopic graphical representations with regions of interest in imaging data obtained relative to brain tissue,
wherein the imaging data is obtained simultaneously with the brain region or brain tissue-specific spectroscopy data; and
displaying a first visual representation of co-registered brain region or brain tissue-specific spectroscopy data and imaging data,
wherein the first visual representation comprises one or more sectional or three-dimensional views of brain tissue, the indicia corresponding to reference ranges for a metabolite, and a spatially correlated map of changes in brain region or brain tissue-specific spectroscopy data,
wherein the reference ranges are generated using statistical analysis of healthy control data to create bounds for upper, lower, and normative ranges for a selected metabolite ratio.

4. The system of claim 3 wherein the range parameters are selected from the group consisting of profile, patient age, pulse sequence, echo time, and field strength of MRI.

5. The system of claim 4 wherein the indicia corresponding to a metabolite are co-registered relative to a region of an MRI image.

6. The system of claim 1, wherein the brain region spectroscopy data is magnetic resonance spectroscopy (MRS) data.

7. The system of claim 5, wherein the imaging data is magnetic resonance imaging (MRI) data.

8. The system of claim 7, wherein the first visual representation shows a correlation between a first voxel and an associated location in the imaging data.

9. The system of claim 8, wherein the first visual representation comprises a color mapping of voxels overlaid relative to an image rendered from the imaging data.

10. The system of claim 9, wherein opacity of the color mapping of voxels is adjustable.

11. The system of claim 7, wherein the computer-executable logic is configured for the execution of displaying a second visual representation of the imaging data and the brain region spectroscopy data, wherein the second representation shows a correlation between a second voxel and an associated location in the imaging data.

12. The system of claim 1, wherein when a first voxel is selected, the first visual representation includes magnetic resonance spectroscopy (MRS) data showing metabolite concentrations.

13. The system of claim 8, wherein the first visual representation comprises a list of each metabolite and each metabolite's concentration detected at the first voxel.

14. A method of analyzing and representing metabolite levels in brain tissue comprising:
processing brain region or brain tissue-specific spectroscopy data to obtain one or more spectroscopic graphical representations of the brain region or brain tissue-specific spectroscopy data;
analyzing brain region or brain tissue-specific spectroscopy data to identify metabolite data or data derived from metabolite data measured relative to brain tissue of a subject using magnetic resonance spectroscopy (MRS);
generating one or more metabolite specific thresholds using a set of ranges of a plurality of parameters, the plurality of parameters comprising a metabolite profile, patient age, echo time, and field strength of magnetic resonance imaging (MRI);

co-registering the one or more spectroscopic graphical representations with regions of interest in imaging data obtained relative to brain tissue, wherein the imaging data is obtained simultaneously with the brain region or brain tissue-specific spectroscopy data;

displaying a first visual representation of co-registered brain region or brain tissue-specific spectroscopy data and imaging data, wherein the first visual representation comprises one or more sectional or three-dimensional views of brain tissue, a spatially correlated map of brain tissue-specific spectroscopy data; and a set of indicia corresponding to a classification based on the one or more metabolite specific thresholds; and displaying a reference range relative to the first visual representation, wherein the reference range comprises a scaling of results on a zero to one-hundred percentile rating based on the plurality of parameters selected.

15. The method of claim 14 wherein the first visual representation includes indicia corresponding to upper, lower and reference ranges for a metabolite, wherein one or more of the ranges are determined using the set of ranges of a plurality of parameters, wherein the set of range parameters comprises profile, patient age, pulse sequence, echo time, and field strength of MRI.

* * * * *